(12) United States Patent
Yanase et al.

(10) Patent No.: US 6,535,686 B1
(45) Date of Patent: *Mar. 18, 2003

(54) SIGNAL PROCESSOR AND SIGNAL PROCESSING METHOD

(75) Inventors: Koji Yanase, Tokyo (JP); Keiko Abe, Kanagawa (JP); Christopher Grey, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/194,826
(22) PCT Filed: Apr. 6, 1998
(86) PCT No.: PCT/JP98/01580
§ 371 (c)(1),
(2), (4) Date: Jan. 21, 1999
(87) PCT Pub. No.: WO98/46020
PCT Pub. Date: Oct. 15, 1998

(30) Foreign Application Priority Data

| Apr. 6, 1997 | (JP) | 9-103828 |
| Apr. 6, 1997 | (JP) | 9-103844 |
| Apr. 6, 1997 | (JP) | 9-103871 |
| Apr. 6, 1997 | (JP) | 9-103883 |
| Apr. 6, 1997 | (JP) | 9-103884 |
| Apr. 6, 1997 | (JP) | 9-103885 |

(51) Int. Cl.$^7$ ............... G11B 27/00; H04N 5/93
(52) U.S. Cl. .................... 386/55; 386/54
(58) Field of Search .............. 386/52, 55, 4, 386/46, 1, 27, 33, 39, 96, 105, 106, 109, 111, 112, 104, 54; 345/723; 360/13; G11B 27/00; H04N 5/93

(56) References Cited

U.S. PATENT DOCUMENTS 5,377,051 A * 12/1994 Lane et al.
5,568,275 A * 10/1996 Norton et al.
6,347,180 B1 * 2/2002 Kotani et al.

FOREIGN PATENT DOCUMENTS

| JP | 8-32923 | 2/1996 |
| JP | 8-56324 | 2/1996 |
| JP | 9-70011 | 3/1997 |
| JP | 9-83867 | 3/1997 |

* cited by examiner

Primary Examiner—Robert Chevalier
(74) Attorney, Agent, or Firm—Frommer Lawrence & Haug LLP; William S. Frommer; Hans R. Mahr

(57) ABSTRACT

The input video signal and/or audio signal is high compressed and stored and it also is low compressed and stored. The high-compressed storied video signal is used to form an editing execution order list which includes an execution order for editing the low-compressed signal.

21 Claims, 23 Drawing Sheets

SIGNAL PROCESSOR AND SIGNAL PROCESSING METHOD

FIELD OF THE INVENTION

The present invention relates to a signal processing device and a signal processing method and is suitably applied to such as a news program production broadcasting system.

DESCRIPTION OF THE PRIOR ART

Heretofore, as one of the news program production broadcasting systems, there has been a system comprised of as shown in FIG. 1.

Thus constructed news program production broadcasting system 1 comprises the first and the second AV (audio video) servers 2 and 3 which record/reproduce AV (audio and/or video) data on an array of hard disk drives (HDD), the plural number of editing devices 4A–4N, a system control unit 5 to control the overall system 1, and a data memory device 6 in which various kinds of data are stored are connected respectively via the network. And non-compressed or low-compressed audio video data D1A–D1N transmitted from the field of collecting materials for an article via a transmission circuit or reproduced from the material tape are supplied to the first AV server 2 via multiple channels.

At this point, the first AV server 2 simultaneously inputs audio video data D1 of one of multiple systems specified out of audio video data D1A–D1N to be supplied under the control of the system control unit 5, and stores these on the specified address position of the recording reproducing unit upon setting these into file respectively.

The audio video data D1 of each file stored in the first AV server 2 can be read out for multiple files simultaneously from the first AV server 2 using each editing device 4A–4N respectively, and images based on said readout audio video data D1 can be displayed on the monitor of the editing device 4A–4N respectively. Furthermore, the operator can form a list to define the editing execution order how to edit the audio video data D1 and produce a news video for broadcasting (hereinafter, this list is referred to as EDL, edit decision list) by visually confirming the image monitor displayed on the editing device 4A–4N, and can register this EDL to the editing device 4A–4N and can make this executed.

In practice, when conducting the EDL, the editing device 4A–4N read out the necessary audio video data D1 by controlling the first AV server 2 and as well,as editing this based on the EDL, transmit audio video data D2A–D2N obtained by this editing processing to the second AV server 3.

At this point, the second AV server 3 successively captures edited audio video data D2A–D2N to be supplied under the control of the system control unit 5, and setting these into file and stores on the specified address position of the recording reproducing unit.

Then, the audio video data D2A–D2N stored in the second AV server 3 are reproduced and expanded at the required time based on the management information in the data memory device 6 and transmitted to an external on-air device (not shown in FIG.) and will be put on the air via said on-air device under the control of the system control unit 5.

Thus, in the news program production broadcasting system 1, audio video data D1A–D1N obtained by collecting materials can be edited to fit the desired condition and can be broadcasted at the predetermined time.

However, according to the news program production broadcasting system 1 described above, if the contents of audio video data D1A–D1N obtained by collecting materials and registered in the first AV server 2 can be confirmed by a good many people and the EDL can be formed by many more personnel, it is considered that the efficiency of news program production work and the quality of news video obtained by editing can be further improved.

However, according to thus constructed news program production broadcasting system 1, since the number of editing devices 4A–4N that can be connected to the first AV server 2 is determined by the data transmission capacity of the first AV server 2, and it was difficult to increase the number of editing devices 4A–4N systematically.

Furthermore, in the case where such system is realized, it is considered that editing work can be conducted more efficiently if automatic editing based on the EDL would be conducted in the editing executor. However, according to the editing executor conceivable at present, EDL must be allocated to the editing executor considering the order of editing processing and this requires involvement by the operator and causes a problem in further improving the efficiency of editing work. Moreover, in the case where the EDL includes the editing processing such as audio split editing, voice over editing, or image effect editing (i.e., special effects editing such as mosaic, page turn and wipe), the operator must conduct the complicated work such as controlling the audio video data input to the editing executor, it causes a problem in further improving the efficiency of the editing work.

Furthermore, as the conventional news program production broadcasting system, there is a device constructed as shown in FIG. 2. As compared this with the conventional news program production broadcasting system shown in FIG. 1, reference/reading device 7A–7N are connected to the output side of the second AV server 3 so that audio video data D2A–D2N stored in the second AV server 3 and the image based on this can be displayed on the monitor. Accordingly, the operator, by reading out the audio video data D2A–D2N before they are transmitted to the on-air equipment from the second AV server 3 using the reference reading device 7A–7N and displaying the image based on this, can confirm visually the edited result of news video before it is actually put on the air.

Thus, in the news program production broadcasting system 1, the audio video data D1A–D1N obtained by collecting materials can be edited to the desired condition and broadcasted at the predetermined time.

However, in the news program production broadcasting system 1 thus constructed, since said system 1 is comparatively large sized, each device is installed in the separate room, e.g., each editing device 4A–4N is installed in the editing room, and each reference/reading device 8A–8N is installed in the sub-adjustment room separately.

Therefore, in the case where the program production staff and people working in the related field in the room different from the sub-adjustment room, such as the program producer and the news draft producer desire to refer and read the edited video, they must go to the sub-adjustment room as necessitated in suspending their works and their working efficiency decreases tremendously. Accordingly, in recent years, in order to achieve higher efficiency the demand for increasing the number of reference and reading devices 8A–8N and by installing them in the plural number of rooms, the edited result of video can be confirmed from each room has been growing.

However, in this news program production broadcasting system 1, since the number of reference reading devices 7A–7N that can be connected to the second AV server 3 is determined by the transmission capacity of said second AV server 3, the number of reference reading devices 8A–8N could not be increased easily before.

Furthermore, as a conventional news program production broadcasting system, there is a device constructed as shown in FIG. 3. This device is different from the device shown in FIG. 1 on the point that an audio booth 11 is connected to the input means of the first AV server 2 and a telephone 12 and a tape recorder 13 are connected to the editing device 4N. In order to overlap voice such as narration over audio video data D1A–D1N audio data D11 will be obtained using a microphone of the audio booth 11 and this is stored in the AV server 2 as an audio file. This audio file is registered in the data memory device 6 and at the time when editing, it is read out by the editing device 4A–4N and combined with audio video data D1A–D1N.

Furthermore, speeches to be obtained such as by telephone interview, after being recorded once by the tape recorder 13 via the telephone 12, will be supplied into editing device 4A–4N as external audio input of the editing device 4A–4N and combined with audio video data D1A–D1N.

On the field of news production of the broadcasting station, the reporter prepares the narration draft to overlap to the audio video data D1A–D1N using the reporter terminal formed of personal computer. Accordingly, if speech narration by said narration draft can be entered with said draft input when entering draft into said reporter terminal, it is considered that the editing work can be conducted more easily.

The object of the present invention is to provide a signal processing device and a signal processing method capable of improving the efficiency of program production work.

It is a further object of the present invention to provide a signal processing device capable of conducting the editing work in the case of combining the collected materials formed of video signal and/or audio signal with speeches more easily.

DISCLOSURE OF THE INVENTION

The present invention has been done considering the above points and is proposing a signal processing device having simple construction capable of using news materials immediately and realizing the common use of the file of news materials to be used in each program in common.

To obviate such problems according to the present invention, we provide the first memory means for memorizing input signals non-compressed or low-compressed, the second memory means for memorizing the input signal high-compressed, an editing execution order list forming means for forming the editing execution order list in which editing execution order is defined based on the high-compressed signal memorized in the second memory means, and an editing execution order list executing means for editing the non-compressed or low-compressed signal memorized in the first memory means based on the editing execution order list formed at the editing execution order list forming means and transmitting. With this arrangement a good many people can confirm the contents of video signals stored in the first and the second memory holding means and simultaneously, editing execution order list can be produced by many more staff, and thereby the signal processing device capable of improving the efficiency of program production works can be realized.

Furthermore, a signal processing method according to the present invention comprises the first step for memorizing the signal upon non-compressing or low-compressing the input signal, as well as high-compressing the input signal, the second step for forming the editing execution order list in which editing execution order is regulated based on the high-compressed signal, and the third step for editing the non-compressed or low-compressed signal based on the editing execution order list formed at the second step and outputting. Thus, according to the present invention, as well as a good many people can confirm the contents of the video signal, editing execution order list can be formed by many more staff, and thus, a signal processing method capable of improving the efficiency of the program production work can be realized.

Furthermore, the signal processing device according to the present invention comprises the first memory means for non-compressing or low-compressing the signal entered at higher speed than the real time and for memorizing, the second memory means for memorizing the signal entered at higher speed than the real time upon high compressing, the editing execution order list forming means capable of forming the editing execution order list in which the editing execution order is defined based on the high compressed signal memorized in the second memory means, and an editing execution order list executing means for editing the non-compressed or low-compressed signal memorized in the first memory means and for outputting it. Thus, according to the present invention, as well as video signals to be entered at high speed can be captured, the contents of video signals stored in the first and the second memory means can be confirmed by many more staff, and thus, the editing execution order list can be formed by more personnel. Thereby, the signal processing device capable of improving the efficiency of program production work can be realized.

Furthermore, the signal processing method according to the present invention comprises the first step for memorizing the signal entered at higher speed than the real time upon high compressing as well as memorizing the signal entered at higher speed than the real time upon non-compressing or low-compressing, the second step for forming the editing execution order list to define the editing execution order based on the high-compressed signal, and the third step for editing the non-compressed or low-compressed signal memorized based on the editing execution order list formed at the second step and for transmitting this. Thus, according to the present invention, the video signal to be entered at high speed can be captured and a good many people can confirm the contents of the video signal memorized and the editing execution order list can be formed by many more personnel. And thus, the signal processing method capable of improving the efficiency of the program production work can be realized.

Furthermore, the signal processing device according to the present invention comprises the first memory means for memorizing the input signal upon non-compressing or low-compressing said signal, the second memory means for memorizing the input signal upon high compressing said signal, the list forming means for forming a list in which editing execution order is regulated based on the high-compressed signal memorized in the second memory means, the image display means for displaying images based on the high compressed signal memorized in the second memory means, and the editing means for editing non-compressed or low-compressed signal memorized in the first memory means based on the list formed by the list forming means; and the editing means supplies the edited signal to the second memory means, the second memory means memorizes the edited signal supplied from the editing means, and the image display means displays the image based on the edited signal memorized in the second memory means. Thus, the number of image display means which can be connected to the second memory means can be greatly increased, and placing the image display means in the plural number of rooms in which program production will be conducted respectively, and the staff associated with the program production in that room can confirm the edited result of news video to be broadcasted actually before it is put on the air in his own room, and thus, the signal processing device capable of improving the efficiency of the program production work can be realized.

Furthermore, the signal processing method according to the present invention comprises a memory step for memorizing the input signal high compressed as well as memorizing the signal to be input upon non-compressing or low-compressing it, a list forming step for forming a list to regulate the edit execution order base on the high-compressed signal, an editing step for editing the non-compressed or low-compressed signal based on the list formed at the list forming step, and an image display step for displaying image contained in said signal as well as memorizing the signal edited at the editing step. And thus, according to the present invention, the plural number of staff associated with the program production can confirm the edited result of the news video to be actually broadcasted in his own room before it is put on air, and thereby the signal processing method capable of improving the efficiency in the program production work can be realized.

Furthermore, the signal processing device according to the present invention comprises the first memory means for memorizing the signal entered at higher speed than the real time upon non-compressing or low-compressing said input signal, the input buffer means for expanding the signal entered at higher speed than the real time to the real time, the second memory means for memorizing the signal upon high-compressing the signal expanded by the input buffer means, the editing execution order list forming means for forming the editing execution order list to define the editing execution order based on the high-compressed signal memorized by the second memory means, and the editing execution order list executing means for editing the non-compressed or low-compressed signal and transmitting said signal. And thus, according to the present invention, as well as high speed video signal can be captured, a large number of people can confirm the contents of video signal memorized in the first and the second memory means. And thus, the editing execution order list can be formed by a great many people and the editing execution order list can be produced by many more personnel. Thereby, the signal processing device capable of improving the efficiency of the program production work can be realized.

Furthermore, the signal processing method according to the present invention comprises the first step for memorizing the signal entered at higher speed than the real time upon non-compressing or low-compressing, and simultaneously memorizing the signal entered at higher speed than real time upon expanding to the real time and high-compressing it, the second step for forming the editing execution order list to define the editing execution order is defined based on the high-compressed signal, and the third step for editing the non-compressed or low-compressed signal memorized based on the editing execution order list formed at the second step. Thus, as well as high speed video signal can be captured, a great many people can confirm the contents of the video signals memorized based on the high-compressed video signal memorized and the editing execution order list can be produced by many more personnel than before. Thus, the signal processing method capable of improving the efficiency of program production work can be realized.

Furthermore, according to the present invention, in the signal processing device for reading out the signal containing video signal and/or audio signal from the memory means in which the signal containing video signal and/or audio signal are stored as recording materials and editing, a terminal equipment connected to the control means of the signal processing device via the network and the combining means for combing the audio signal collected at the terminal equipment to video signal and/or audio signal as the editing material for the signal containing video signal and/or audio signal are provided. Thus, according to the present invention, since the audio file recorded on the terminal equipment to be connected via the network is combined with video signal and/or audio signal and is synchronized with the video system, the audio file recorded on the terminal can be used as the broadcasting material.

Furthermore, according to the present invention, in the signal processing device for conducting the desired editing processing upon reading out the signal memorized in the memory means, the list forming means for forming the list on which the editing content is defined, the editing execution means for executing the editing processing upon reading out the desired signal from the memory means based on the list allocated, and the control means for managing the execution schedule of the editing processing and for assigning the formed list to the editing execution device are provided. With this arrangement, according to the present invention, the editing processing can be executed without involvement of the operator as the conventional device and the automatic editing without the operator can be executed. Accordingly, the signal processing device capable of conducting the editing work more efficiently can be realized.

DESCRIPTION OF THE PREFERRED EMBODIMENTS

An embodiment of the present invention will be described in detail with reference to the accompanying drawings.

(1) Construction of News Program Production Broadcasting System

Figure 4:
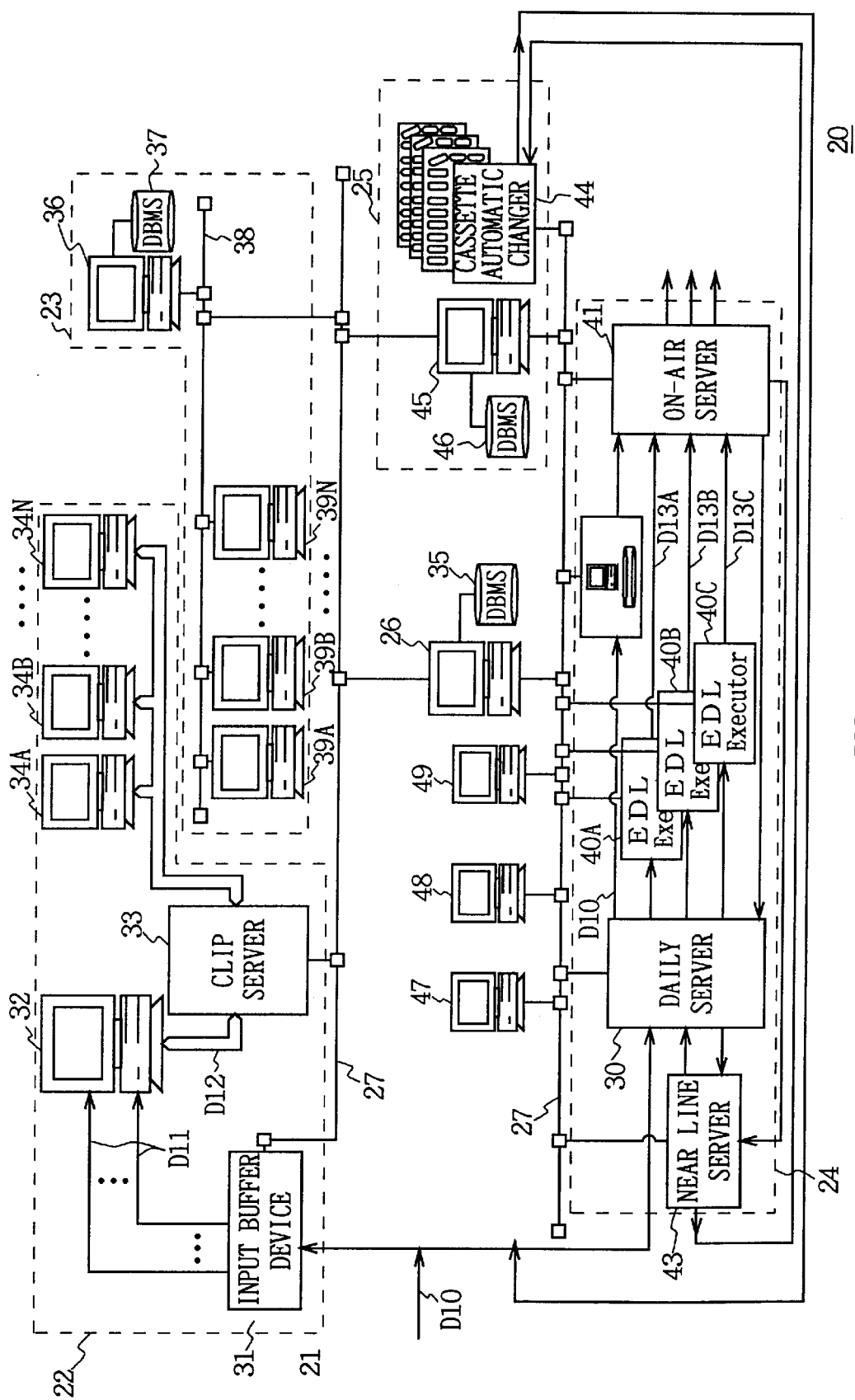
FIG. 4 is a block diagram showing the construction of a news program production broadcasting system according to the embodiment of the present invention.

FIG. 4 generally shows a news program production broadcasting system 20 and this system is comprised of an off-line EDL forming system 22 for forming EDL (edit decision list; a list on which the editing execution order is defined), an on-air list forming system 23 for forming a list on which the transmission time of each audio video data edited is defined (hereinafter referred to as on-air list) and news drafts and the order of usage of said news drafts, an on-line edit transmission system 24 for executing the editing processing based on the EDL formed at the off-line EDL forming system 22, an archive 25 for storing the necessary audio video data, and a system control unit 26 for controlling overall news program production broadcasting system 20; and these off-line EDL forming system 22, on-air list forming system, on-line edit transmission system 24, archive 25 and system control unit 26 are connected via LAN (local area network) 27.

In this news program production broadcasting system 20, data D10 containing audio and/or video data transmitted via the transmission circuit from the field of collecting materials or satellite communications circuit, or reproduced from the material tape by the video tape recorder (hereinafter referred to as AV data) will be supplied through multiple channels and entered into a daily server 30 of the on-line edit transmission system 24 and an input buffer device 31 of the off-line EDL forming system 22. In the following explanations, suppose that each AV data D10 will be supplied under the condition non-compressed or low compressed (e.g., MPEG (Moving Picture Experts Group) 2 4:2:2P@ML (ITU-R recommendations).

The daily server 30 is mainly comprised of a recording reproducing unit for recording and reproducing the AV data D10 onto the non-linear accessible recording medium formed of an array of HDD and a compression expanding unit represented by MPEG2, and high speed data input/output is possible and it simultaneously captures AV data D10 designated from among multiple AV data D10 to be supplied under the control of the system control unit 26 and setting them into file, stores on the address position designated in the recording reproducing unit. The AV data D10 to be entered into the daily server 30 is actually multiple inputs, however, in order to simplify the explanation, FIG. 4 shows the case of one input. Of course we see no harm in one input.

On the other hand, the input buffer device 31 successively captures AV data D10 of the same system as the daily server 30 from among each AV data D10 to be supplied. And in the case where this captured AV data 10 is high speed data, the input buffer device 31, as well as time-dividing into multiple channels, expands each channel of AV data D10 to real time respectively, and transmits the resulting AV data D11 of each channel to an encoder unit 32 respectively. Moreover, in the case where the captured AV data D10 is the real time speed data, transmits said AV data D10 to the encoder unit 32 as it is.

The encoder unit 32 successively captures each AV data D11 (or D10) to be supplied and high compression encodes these with the prescribed compression system such as JPEG (Joint Photographic Experts Group) system in order that the transmission rate becomes approximately 2 (Mbps) and transmits the resulting high compression coded data D12 to the clip server 33.

The clip server 33 has approximately the same construction as that of the daily server 30 and comprises a recording reproducing unit for conducting the recording/reproduction of the high compression coded data D12 to the non-linear accessible recording medium formed of an array of HDD, and successively captures input high compression coded data D12 under the control of the system control unit 26 and sets them into file and stores on the address position designated in the recording/reproduction unit.

Then, each file data (high compression coded data D12) stored in the clip server 33 can be read out in utilizing the plural number of EDL forming devices 34A–34N connected to the clip server 33 respectively.

In practice, when forming the EDL, if the command to read out the desired file is entered by the operator, each EDL forming device 34A–34N accesses to the system control unit 26 successively through the clip server 33 and the LAN 27, and by controlling the clip server 33 via said system control unit 26, makes the high compression coded data D12 of the file corresponding to the clip server 33 read out successively.

Furthermore, EDL forming devices 34A–34N decode the high compression coded data D20 read out from the clip server 33 and display the resulting image based on the AV data on the monitor.

At this point, the operator controls the clip server 33 via EDL forming devices 34A–34N and can make the clip server 33 to execute the desired operation (such as play, rewind or fast forward), and moreover, at this point, the operator can form the EDL by entering various kinds of information required for editing such as in-points and out-points by visually confirming images displayed on the monitor of said EDL forming devices 34A–34N.

Furthermore, the EDL forming devices 34A–34N read out the corresponding high compression coded data D20 from the clip server 33 based on the EDL formed and decode this, and can edit the resulting AV data based on the EDL and can display the edited result on the monitor, and thus the operator can confirm the edited result formed based on the EDL.

Then, the EDL data formed at the EDL forming devices 34A–34N (hereinafter referred to as EDL data) will be transmitted to the system control unit 26 from said EDL forming device 34A–34N successively through the clip server 33 and the LAN 27 and registered as database in the external memory device 35 under the control of said system control unit 26.

On the other hand, the on-air list forming system 23 is comprised of an external memory device 37 in which various kinds of data such as on-air list are memorized and which is used as a database, a database management device 36 for managing the data memorized in the external memory device 37, and the plural number of personal computers 39A–39N connected respectively via the database management device 36 and the network 38, and the on-air list and the draft of each news item in each news program to be read by the announcer can be formed using these personal computers 39A–39N.

Then, each data of thus formed on-air list and draft will be registered as database in the external memory device 37 under the control of the database management device 36 and the data of on-air list (hereinafter referred to as on-air list data) will be supplied to the system control unit 26 via the LAN 27 and registered as a dababase in the external memory device 35.

Then, the system control unit 26 controls the on-line edit transmission system based on the EDL data and the on-air list data registered in the external memory device 35.

More specifically, the system control unit 26 constantly monitors the operating condition of the EDL executors 40A–40N comprised of the plural number of editing devices thereof connected to the daily server 30 of the on-line editing transmission system 24, and when one of the EDL executors 40A–40N terminates the editing processing, reads out the EDL data memorized in the external memory device 35 with priority to the earlier on air based on the on-air list data and transmits this to the EDL executors 40A–40C via the LAN 27.

EDL executors 40A–40N control the daily server 30 based on the EDL data to be supplied from the system control unit 26 and let said daily server 30 to read out the necessary AV data D10 successively from among non-compressed or low compressed AV data D10 stored in said daily server 30. Moreover, in the case where this AV data D10 is low compressed, the EDL execution devices 40A–40N, after decoding this, edit this AV data D10 to the condition specified based on the EDL data supplied and transmits the resultant AV data D13A–D13C to the on-air server 41 respectively.

In this connection, a manually operating editing device 42 is connected to the daily server 30, and the operator can read out the AV data D10 stored in the daily server 30 using said editing device 42 and can edit this AV data D10. And the resultant edited AV data D13D will be transmitted to the on-air server 41.

The on-air server 41 comprises a recording/reproduction unit for recording or reproducing the edited AV data D13A–D13D on the non-linear accessible recording medium such as HDD and MO, and it successively captures AV data D13A–D13D entered under the control of the system control unit 26 and after setting these into file, stores on the address position specified of the recording medium.

Then, the transmission time of each file data (edited AV data D13A–D13D) stored in this on-air server 41 will be controlled by the on-air terminal 49 connected to the LAN 27 based on the on-air data stored in the external memory device 35, and when the specified time comes, it is read out from the on-air server 41 under the control of the system control unit 26 and transmitted to the on-air device of the later stage (not shown in FIG.) and video material and audio material to be put on the air in the news program will be transmitted.

Accordingly, in this news program production broadcasting system 20, the editing processing is executed using the AV data D10 non-compressed or low compressed in the on line editing ransmission system 24 based on the EDL formed in the off-line EDL forming system 22, and the resultant AV data D13A–D13D can be transmitted to the on-air device based on the on-air list, and thus, the news audio and video edited to the specified condition can be put on the air at the specified time.

In addition to the above, in the case of this news program production broadcasting system 20, a near line server 43 having the recording/reproducing unit for recording and/or reproducing AV data on the recording medium, which is inexpensive but having large memory capacity, such as MO (management optical) changer and cassette automatic changer are provided, and under the control of the system control unit 26, AV data D10, D13A–D13D stored in the daily server 30 and the on-air server 41 will be transmitted to the near-line server 30, and these can be stored in said near-line server 43.

Furthermore, the AV data D10, D13A–D13D stored in the near-line server 43 can be transmitted to the daily server 30 under the control of the system control unit 26 and stored in said daily server 30, and thus, the memory capacity of the input stage of the on-line edit transmission system 24 can be increased without increasing the memory capacity of the daily server 30 having the plural number of expensive and non-linear accessible recording media.

Moreover, the near-line server 43 is connected to a cassette automatic changer 44 in the archive 25 via the prescribed interface such as SCSI (small computer system interface), and under the control of the system control unit 25 it transmits AV data D10, D13A–D13D in the near-line server 43 to the cassette automatic changer 44 in the archive 25 and can record said AV data D10, D13A–D13D on the prescribed recording medium such as magnetic tape via this cassette automatic changer 44. Thus, in this news program production broadcasting system 20, the necessary AV data can be stored as the material.

At this point, various management data regarding the contents of AV data D10, D13A–D13D will be supplied into the database management device 45 provided in the archive 25 from the system control unit 26 via the LAN 27. And these various management data will be given to the external memory device 46 and stored as database under the control of the database management device 45.

Furthermore, at this point, under the control of the system control unit 26, draft data corresponding to the AV data can be transmitted to the database management device 45 of the archive 25 from the database management device 36 of the on-air list forming system 23 via the LAN 27, and this draft data can be registered on the database in the external memory device 46 under the control of the database management device 45.

Furthermore, the AV data D10, D13A–D13D recorded on the recording medium such as magnetic tape stored in the archive 25 will be reproduced by the cassette automatic changer 44 and can be transmitted to the input buffer device 31 of the off-line EDL forming system 22 and the daily server 30 of the on-line editing transmission system 24, and thereby, the AV data D10, D13A–D13D stored can be used again for editing.

In the case of this news program production broadcasting system 20, a filing terminal 47 is connected to the LAN 27, and the specification of AV data D10 to be entered into the input buffer device 31 and the daily server 30, the input of file name of said AV data D10 specified, and the confirmation of contents of the AV data D10 stored in the daily server 30 can be conducted using said filing terminal 47.

Moreover, in the case of this news program production broadcasting system 20, an EDL preview terminal 48 is also connected to the LAN 27, and using this EDL preview terminal 48 the EDL data stored in the external memory device 35 can be read out, and making any one of EDL executors 40A–40C to execute the editing based on said EDL data, the execution result (AV data edited based on the EDL data) can be displayed on the monitor (not shown in FIG.) connected to the EDL executors 40A–40C as the image and character data and the edited audio data can be transmitted from the speaker.

Furthermore, in the case of this news program production broadcasting system 20, the desired file data stored in the on-air server 41 (edited AV data D13A–D13D) can be read out using the on-air terminal 49 and audio and video based on said file data can be put out from a monitor and speaker connected to the on-air server 41, and thus, the operator can confirm the edited news video to be actually broadcasted before it is put on air.

(2) Processing of System Control Unit 26

In the case of this news program production broadcasting system 20, various kinds of processings described above are all conducted under the control of the system control unit 26.

Figure 5:
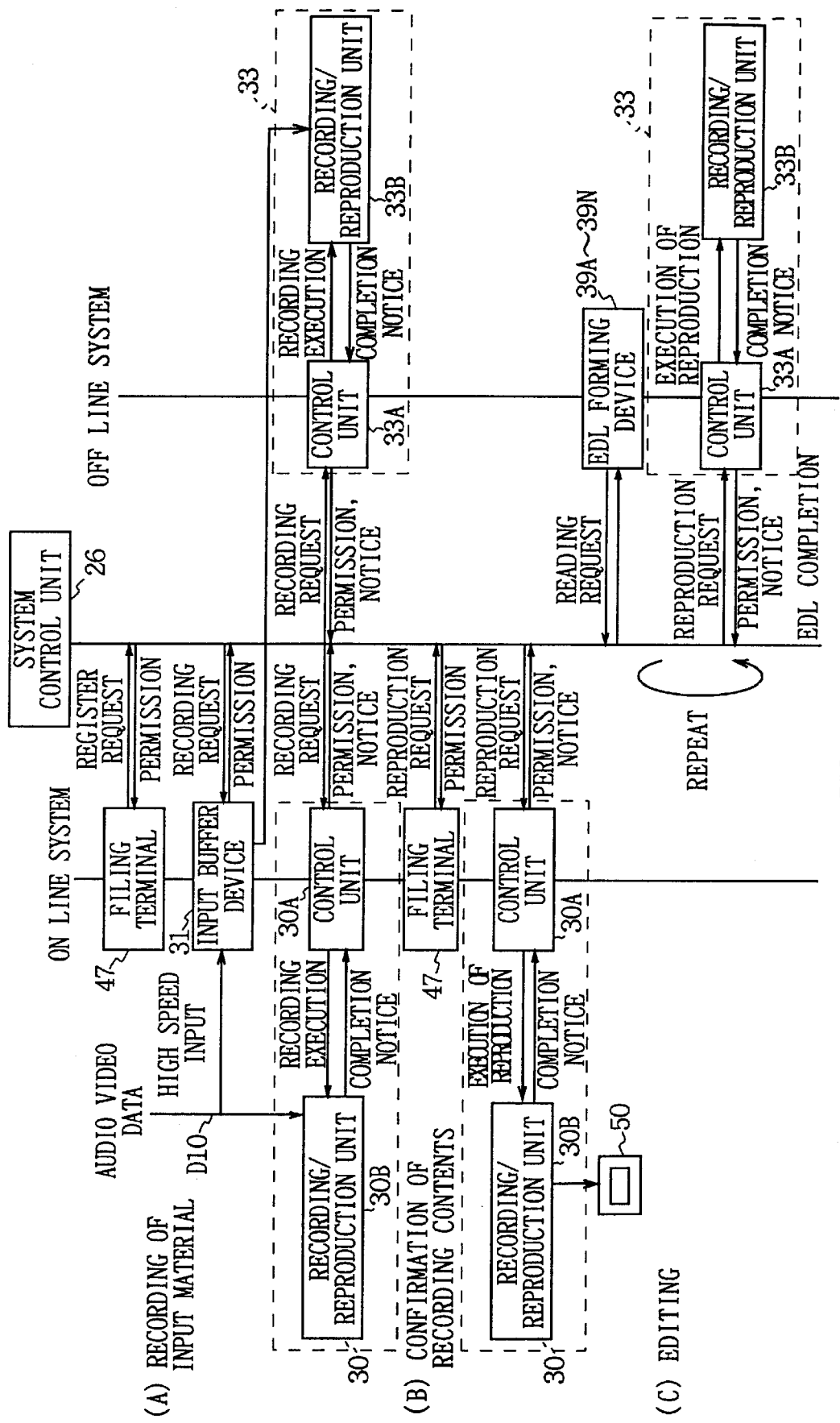
FIG. 5 is a conceptual diagram illustrating the processing of a system control unit.

In practice, as shown in FIG. 5(A), when the registration request of AV data is given from the filing terminal 47 by the operator, the system control unit 26, by giving the recording request to the input buffer device 31, the control unit 33A of the clip server 33, and the control unit 30A of the daily server 30, determines whether these input buffer device 31, clip server 33 and daily server 30 are in the state capable of capturing the AV data or not (i.e., if space is available in memory capacity and input/output port).

Then, upon receiving the permission from the input buffer device 31, the clip server 33 and the daily server 30, the system control unit 26 gives the recording permission to the filing terminal 47.

Moreover, when the AV data recording command is given from the filing terminal 47, the system control unit 26 gives the recording command to the input buffer device 31 and this AV data D10 will be captured.

Furthermore, at this point, the system control unit 26, giving the recording request to the control unit 30A of the daily server 30, the AV data D10 specified will be successively recorded in the recording reproduction unit 30B of said daily server 30, and simultaneously by giving the recording command to the control unit 33A of the clip server 33, the high compression coded data D12 to be supplied from the encoder 32 will be recorded in the recording reproduction unit 33B of the clip server 33.

Furthermore, when the notification to stop recording is given from the control unit 30A of the daily server 30 and the control unit 33A of the clip server 33, the system control unit 26 terminates a series of processings.

Furthermore, as shown in FIG. 5(B), when a reproduction request of the file stored in the recording/reproduction unit 30B of the daily server 30 is given from the filing terminal 47, the system control unit 26, by giving the reproduction request to the control unit 30A of the daily server 30, determines whether the daily server 30 is in a reproducible state or not, and if an affirmative result is obtained, it gives the reproduction permission to the filing terminal 47.

And then, when the reproduction request of the file is given from the filing terminal 47, the system control unit 26, by giving the reproduction request of said file to the control unit 30A of the daily server 30, makes it to read out the AV data D10 of said file from the recording/reproduction unit 30B of the daily server 30 under the control of the control unit 30A, and by giving this to the daily server 30 and the monitor 50, makes it display the image based on said AV data D10.

On the other hand, as shown in FIG. 5(C), when a reading request of the file stored in the recording/reproduction unit 33B of the clip server 33 is given from the EDL forming devices 39A–39N, the system control unit 26 confirms whether the clip server 33 is in a reproducible state or not by giving the reading request to the control unit 33A of the clip server 33 and if an affirmative result is obtained, it gives the reading permission to the corresponding EDL forming device 39A–39N.

Then, when the reading command of the file is given from the EDL forming devices 39A–39N, the system control unit 26, by giving the reproduction command of that file to the control unit 33A of the clip server 33, the high compression coded data D20 of the corresponding file will be read out from the recording reproducing unit 33B of the clip server 33 and sent out to the corresponding EDL forming device 39A–39N.

Moreover, the system control unit 26 conducts the similar operation to that of the above whenever the reading command of the file is given from the EDL forming device 39A–39N, and the image based on the high compression coded data D20 of the file specified will be displayed on the monitor.

Figure 6:
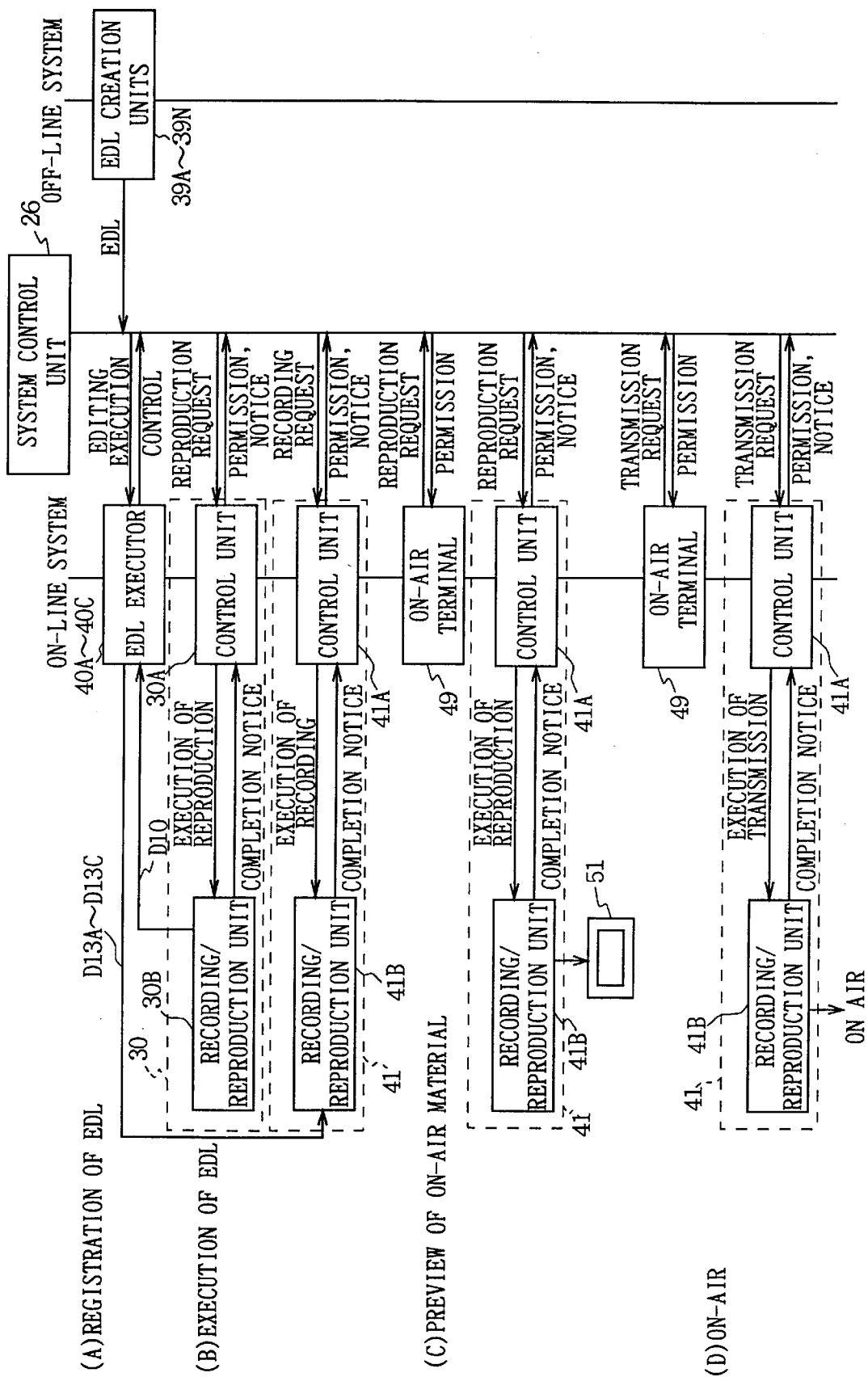
FIG. 6 is a conceptual diagram illustrating the processing of a system control unit.

Furthermore, when the EDL registration command and that EDL data are given from the EDL forming devices 39A–39N afterwards as shown in FIG. 6(A), the system control unit 26 stores this in the external memory device 35.

Furthermore, as described above, the system control unit 26 constantly monitors the operating condition of each EDL executors 40A–40C and if there occurs space in either one of EDL executors 40A–40C, as shown in FIG. 6(B), reading out the EDL data from the external memory device 30, outputs this to the EDL executors 40A–40C.

Moreover, when the reproduction request of the AV data D10 necessary for editing is given from the EDL executors 40A–40C, the system control unit 26, as well as confirming whether said daily server 30 is in a reproducible state or not by giving the reproduction request to the control unit 30A of the daily server 30, determines whether the on-air server 41 is in a data recordable state or not by giving the recording request to the control unit 41A of the on air server 41.

And then, the system control unit 26, receiving a permission from the control unit 30A of the daily server 30 and the control unit 41A of the on air server 41, by giving the reproduction command of the AV data D10 specified to the control unit 30A of the daily server 30, makes that AV data be read out from the recording/reproduction unit 30B of said daily server 30 and outputted to the corresponding EDL executors 40A–40C.

Furthermore, at this point, the system control unit 26, by giving the recording command to the control unit 41A of the on-air server 41, and makes the edited AV data D13A–D13C to be outputted from the EDL executors 40A–40C be registered successively on the recording/reproduction unit 41B of said on-air server 41.

On the other hand, as shown in FIG. 6(C), when the reproduction request of the file stored in the recording reproducing unit 41B of the on air server 41 is given from the on air terminal 49, the system control unit 26, by giving the reproduction request to the control unit 41A of the on air server 41, determines whether said on-air server 41 is in a data reproducible state or not, and if an affirmative result is obtained, gives the reproduction permission to the on-air terminal 49.

Then afterwards, when the reproduction command of the prescribed file is given from the on-air terminal 49, the system control unit 26, by giving the reproduction command of the specified file to the control unit 41A of the on-air server 41, makes it to read out the AV data D13A–D13D of that file from the recording reproduction unit 41B of said on air server 41 and to output this to the monitor 51 connected to said on air server 41. Thus, system control unit 26 can display the image based on the AV data D13A–D13D of the file specified on the monitor 51.

Furthermore, as shown in FIG. 6(D), when the on air request of the fixed file is given based on the on air list from the on-air terminal 49, the system control unit 26, by giving the on air request of said file to the control unit 41A of the on air server 41, makes the AV data D13A–D13D of that file read out from the recording/reproduction unit 41B of the on air server 41 under the control of said control unit 41A and transmitted to the on air device. Moreover, the system control unit 26, when the completion notice is given from the control-unit 41A of the on-air server 41 and then, terminates the on-air processing of that file.

(3) Operation of the Present Embodiment

According to the construction described above, this news program production broadcasting system 20, as well as storing non-compressed or low compressed AV data D10 to be supplied in the daily server 30, after high compression coding said AV data D10, stores this in the clip server 33.

Then, this high compression coded AV data D10 (high compression coded data D12) stored in the clip server 33 will be read out by the EDL forming device 34A–34N and can be decoded, and images based on the decoded AV data D10 can be monitor displayed on the EDL forming device 34A–34N. Also, the operator can form the EDL using the EDL forming device 34A–34N based on the image monitor displayed.

And then, the EDL executors 40A–40N execute the editing processing using the non-compressed or low compressed AV data D10 stored in the daily server 30 based on the EDL data formed, and the resulting AV data D13A–D13C will be registered in the on-air server 41 and reproduced at the time specified and transmitted.

Here, in the case of this news program production broadcasting system 20, since the AV data D10 to be stored in the clip server 33 is the high compression coded data as described above, it can be read out at higher speed than the case of reading out the non-compressed or low compressed AV data. Because of this, in this news program production broadcasting system 20, more EDL forming devices 34A–34N can-be connected to the clip server 33.

Accordingly, in this news program production broadcasting system 20, if comparisons are made with the conventional news program production broadcasting system 1 described above in FIG. 1, in the case where the first AV server 2 (FIG. 1) and the clip server 33 (FIG. 4) have the same data transmission capacity, more EDL forming devices 34A–34K can be connected to the clip server 33 than the number of editing devices 4A–4N (FIG. 1) that can be connected to the first AV server 2.

As a result, in this news program production broadcasting system 20, many more personnel can confirm the contents of AV data D10 obtained by collecting materials and registered in the clip server 33 and the daily server 30, and the EDL can be formed by many more personnel. Moreover, in this news program production broadcasting system 20, the number of EDL forming devices 34A–34N can be increased inexpensively and easily as compared with the case of editing devices 4A–4N of the conventional news program production broadcasting system 1 (FIG. 1), this news program production broadcasting system 20 has the advantage over the conventional device in expandability.

According to the foregoing construction, since the non-compressed or low compressed AV data D10 to be supplied is stored by the daily server 30, and said AV data D10 is high compression coded and stored in the clip server 33, the EDL will be formed by the EDL forming devices 34A–34N based on the high compression coded AV data (high compression coded data D12) stored in the clip server 33 and the editing processing will be conducted by the EDL executors 40A–40C using the AV data D10 stored in the daily server 30 based on the EDL obtained, the EDL can be formed by many more personnel and thus, the news program production system capable of improving the efficiency of the program production work can be realized.

(4) Other Embodiment

The embodiment described above has dealt with the case of applying the daily server 30 formed of AV server comprising the recording reproduction unit 30B (FIG. 5) formed of an array of discs as the first memory holding means for memorizing the non-compressed or low compressed AV data D10 to be supplied. However, the present invention is not only limited to this but also various other memory means can be applied.

Furthermore, the embodiment described above has dealt with the case of applying the clip server 33 formed of AV server having the input buffer device 31, the encoder unit 32 and the recording reproduction unit 33B (FIG. 5) formed of disc arrays and not having the data compression/expanding unit as the second memory holding means for high compressing and memorizing the AV data D10 to be supplied. However, the present invention is not only limited to this but also such as one AV server having the data compression expanding function may be used, and as the construction of the second memory holding means various other constructions can be applied.

Furthermore, the embodiment described above has dealt with the case of applying EDL forming devices 34A–34N comprised of personal computers as the editing execution order list forming means which is capable of forming the EDL based on the high compressed AV data D10 (high compression coded data D20) memorized in the clip server 33. However, the present invention is not only limited to this but also the EDL forming device having various other constructions can be applied.

Furthermore, the embodiment described above has dealt with the case of forming the editing execution order list executing means for editing the non-compressed or low compressed AV data D10 memorized in the daily server 30 based on the EDL formed in the EDL forming devices 34A–34N by the system control unit 26 for controlling the overall news program production broadcasting system 20 and the plural number of EDL executors 40A–40C. However, the present invention is not only limited to this but also the control unit for controlling the operating condition of EDL executors 40A–40C based on the EDL formed may be provided separately from the system control unit 26, and as the construction of the editing execution order list executing means, various other constructions can be applied.

Furthermore, the embodiment described above has dealt with the case of applying the present invention to the news program production broadcasting system 20. However, the present invention is not only limited to this but also it is applicable to other various signal processing devices for editing the input video signal.

(5) Audio Video Editing Processing (5-1) The First Embodiment

Figure 1:
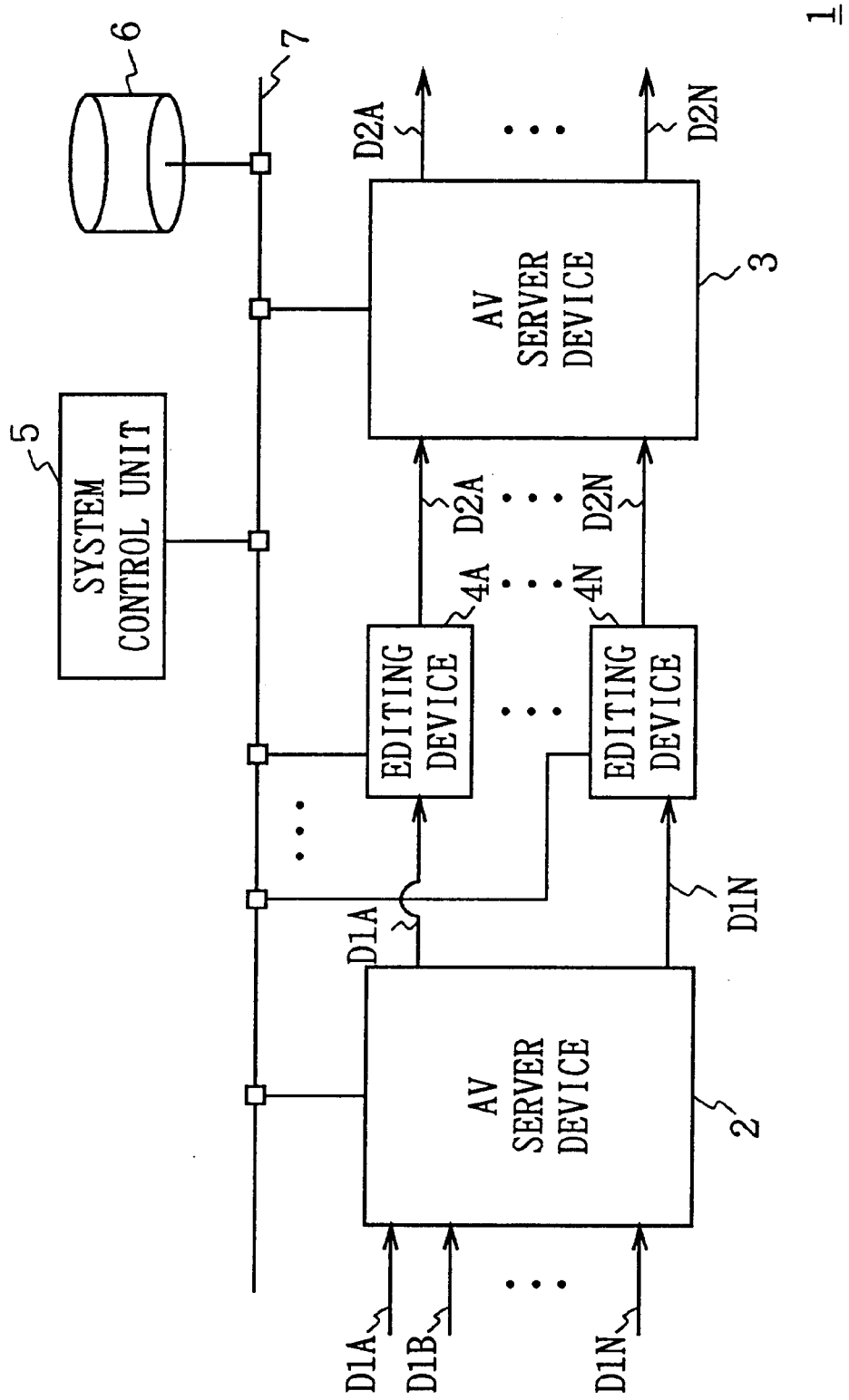
FIG. 1 is a block diagram showing the construction of a conventional news program production broadcasting system.
Figure 8:
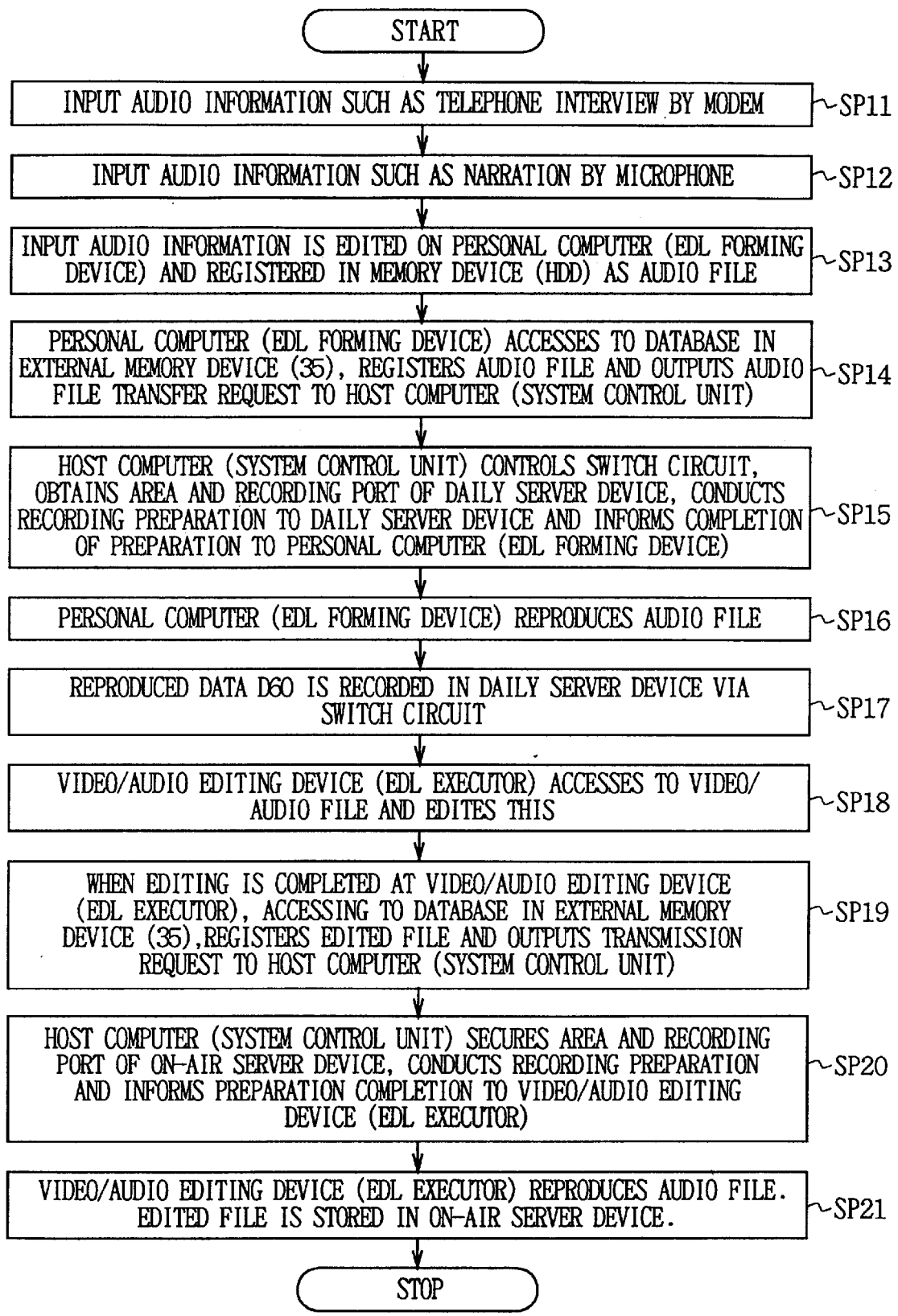
FIG. 8 is a flow chart showing the editing processing procedure according to the first embodiment.

FIG. 1, in which the corresponding parts of FIG. 4 are given the same reference numerals, shows the news program production system 60 which is capable of combining audio data D60 such as speech narration into AV data D10 and this system conducts audio editing according to the processing procedure shown in FIG. 8.

More specifically, at the step SP11 of FIG. 8, the reporter enters audio information such as telephone interview into the EDL forming devices 34A–34N by a modem 61 connected to the EDL forming devices 34A–34N formed of personal computers. Then, at the step SP12, the reporter enters audio information such as narration by using a microphone 66.

The audio information thus entered into EDL forming devices 34A–34N will be edited at the step SP13 by the reporter and registered on the external memory device formed of such as hard disc device (HDD) added to said EDL forming devices 34A–34N as an audio file.

Furthermore, at the step SP14, the EDL forming devices 34A–34N registers the audio file accessing to the database in the external memory device 35 provided in the system control unit (host computer) 26 and outputs the audio file transmission request to the system control unit 26. At this point, at the step SP15, the system control unit 26 controls the switch circuit provided on the input terminal of the daily server 30 and conducts the recording preparation of the audio data D60 onto the daily server 30 by obtaining the area and recording port of the daily server 30. And when said preparation is complete, the system control unit 26 informs the completion of said preparation to the EDL forming devices 34A–34N.

Then, at the step SP16, the EDL forming devices 34A–34N reproduce the audio file and the reproduced audio data D60 will be recorded in the recording area specified in the daily server 30 via the switch circuit of the daily server 30. At this point, the audio data D60, after being high compressed via an input buffer 31 and an encoder 32 of the off-line EDL forming system 22, will be also recorded in the clip server 33. Thus, the same audio data D60 will be corresponded between the off-line EDL forming system 22 and the on-line EDL execution transmission system 24 and recorded on both systems, and the EDL data can be formed by confirming the contents of said recorded data at the off-line EDL forming system 22.

At the step SP18 of FIG. 8, the EDL executor 40A–40C, accessing to the audio video file in the daily server 30, edit this based on the EDL data formed at the on-line EDL forming system 22. At the step SP19, when the editing by said EDL executors 40A–40C is complete, said EDL executors 40A–40C access to the database in the external memory device 35 and register the edited file and output the transfer request to the system control unit 26.

Then, at the step SP20, the system control unit 26 conducts the recording preparation by obtaining the area and recording port of the on-air server 41, and when said preparation is completed, informs said completion to the EDL executors 40A–40C. Upon receiving this notice, the EDL executors 40A–40C reproduce the audio file at the step SP21 and record the edited file on the on-air server 41.

According to the foregoing construction, the news program production broadcasting system 60 (FIG. 7) in which the audio file formed at the EDL forming devices 34A–34N comprised of personal computer provided as the reporter terminal is combined with images and is utilized for the purpose of broadcasting. Moreover, the telephone audio information recorded via the modem 61 at said EDL forming devices 34A–34N is combined with images and utilized for the broadcasting.

Thus, according to the foregoing construction, it becomes unnecessary to provide an audio booth and telephone speech recording equipment which were provided in the conventional device aside from the reporter terminal, and the construction of the news program production system 60 can be simplified.

Furthermore, since audio information exists in the news program production broadcasting system 60 as the computer file, its transmission to the other system via the network can be made easy.

(5-2) The Second Embodiment

Figure 7:
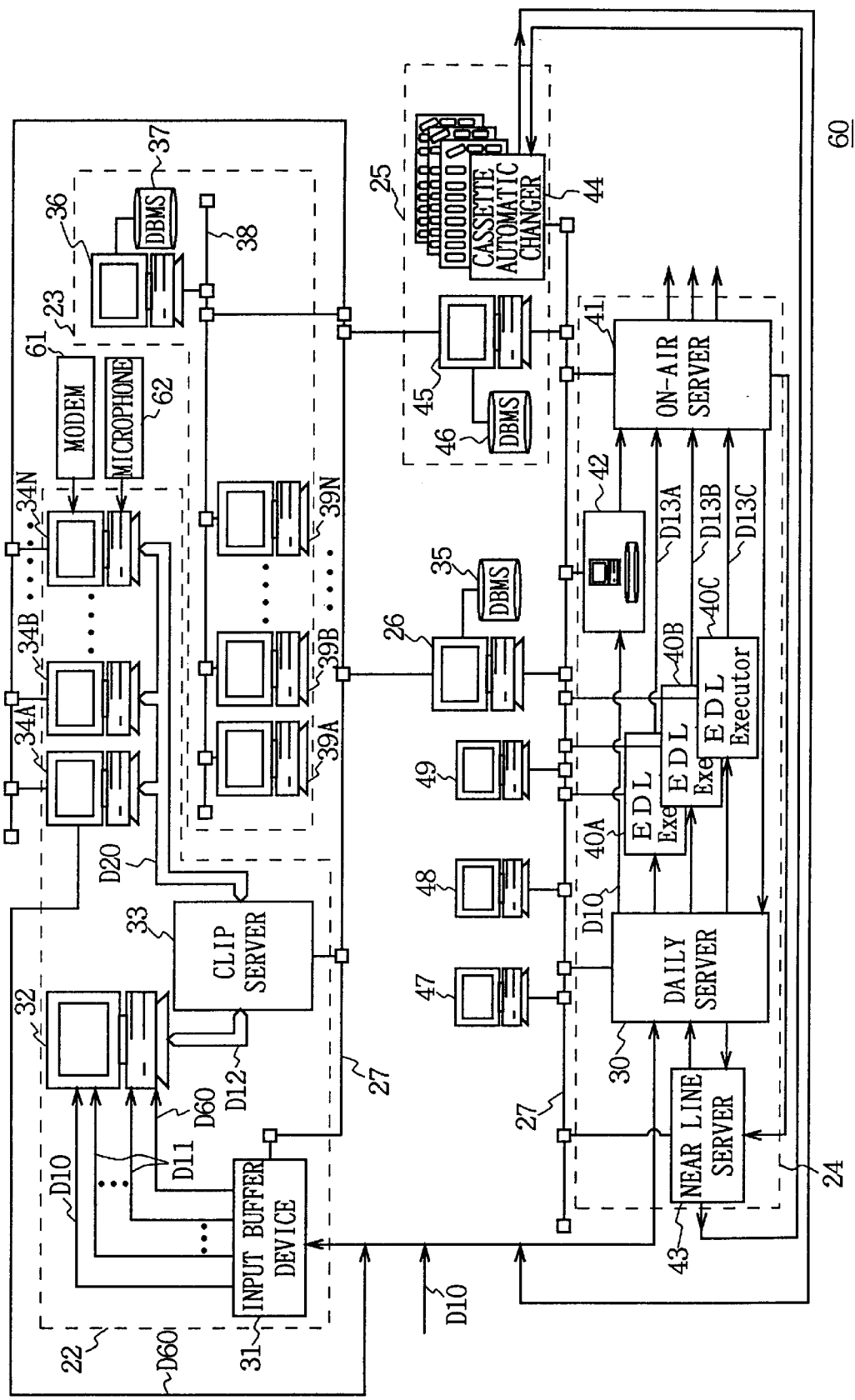
FIG. 7 is a block diagram showing the news program production broadcasting system according to the first embodiment.
Figure 9:
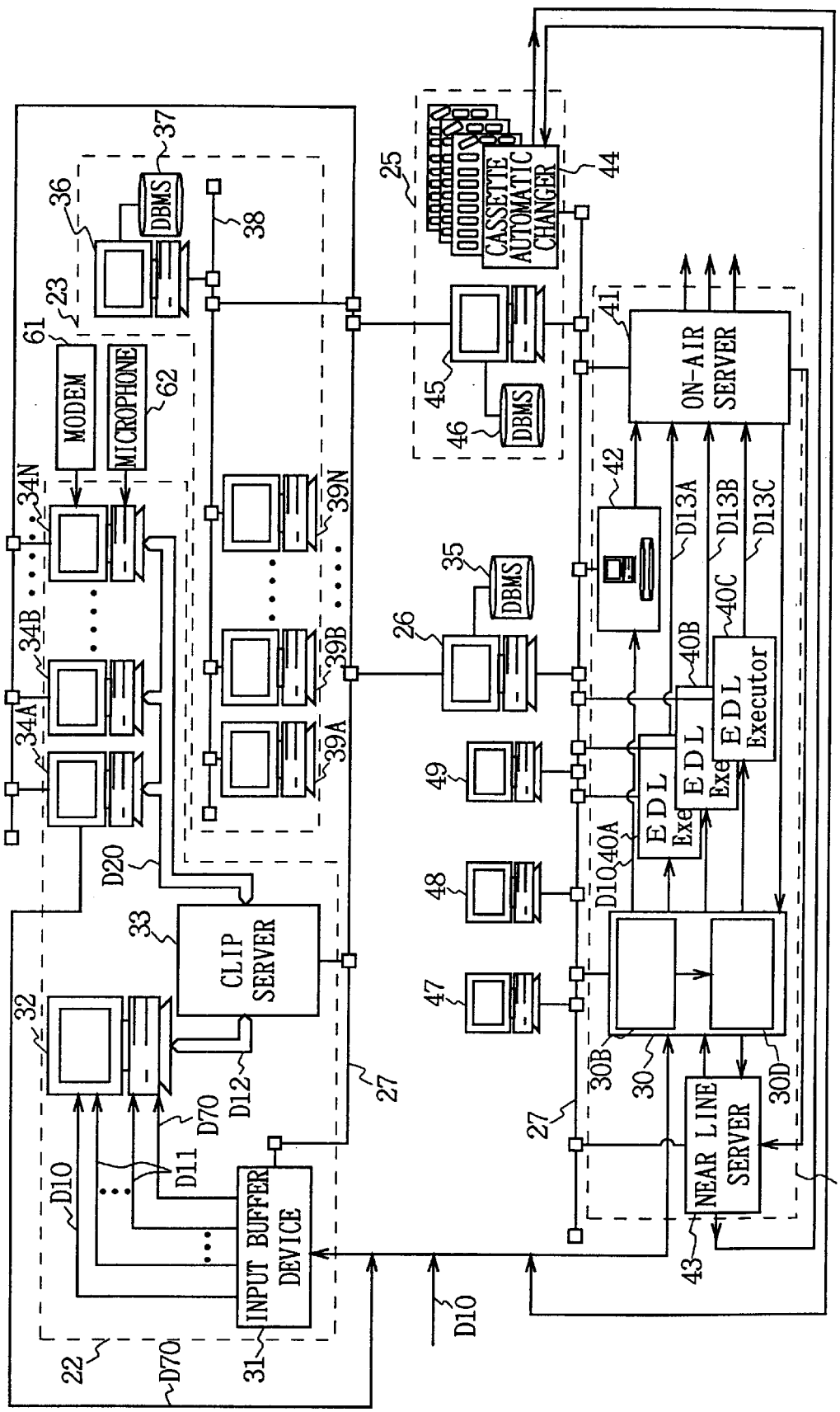
FIG. 9 is a block diagram showing the news program production broadcasting system according to the 2nd embodiment.
Figure 10:
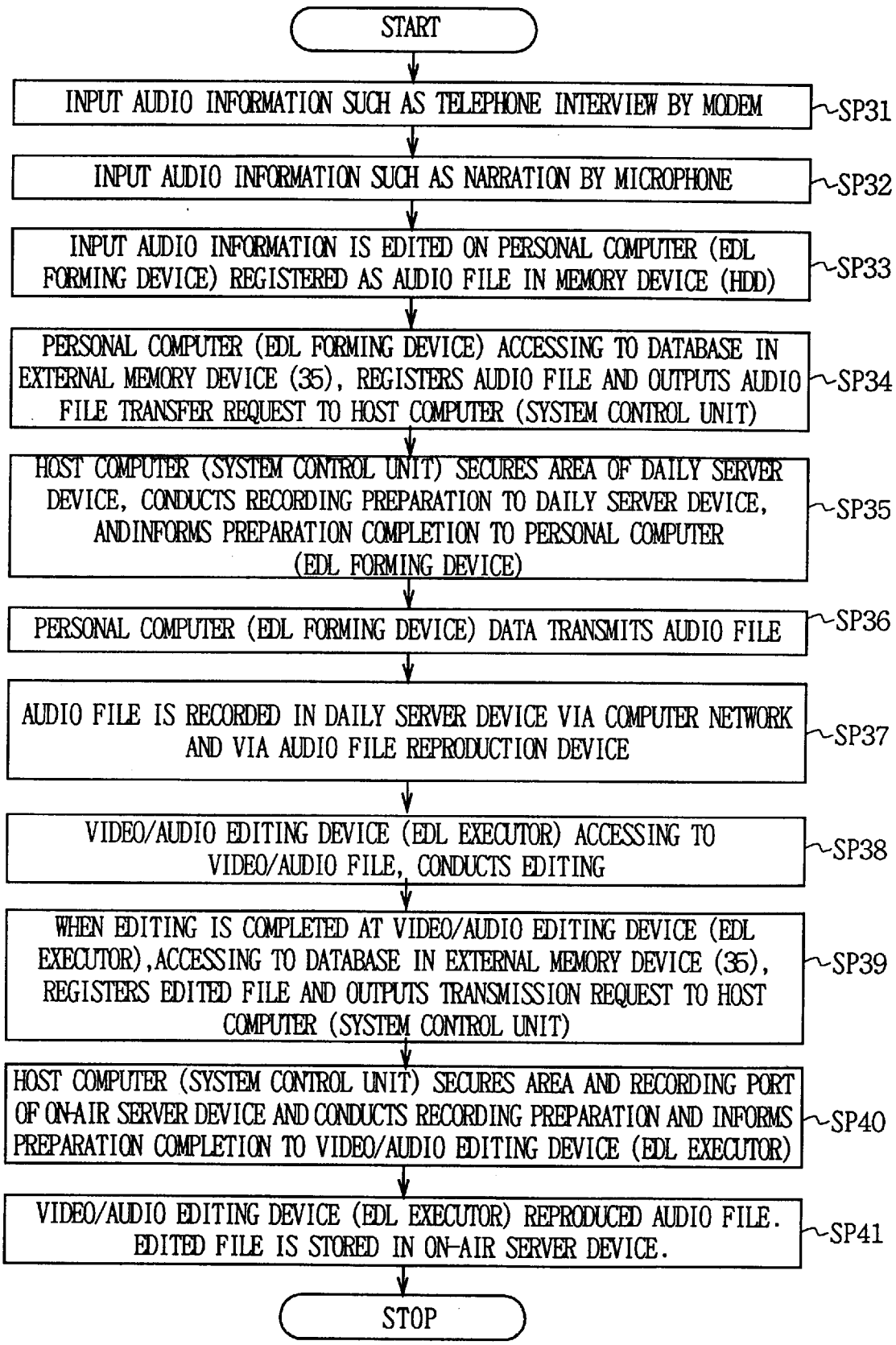
FIG. 10 is a flow chart showing the editing processing procedure according to the 2nd embodiment.

FIG. 9 in which the corresponding parts of FIG. 7 are given the same reference numerals, shows the news program production broadcasting system 70 capable of combining the audio data D60 such as audio narration with the AV data D10 and conducts audio editing according to the processing procedue shown in FIG. 10.

More specifically, at the step SP31 in FIG. 10, the reporter supplies audio information such as telephone interview into EDL forming devices 34A–34N by means of a modem 61 connected to the EDL forming devices 34A–34N comprised of personal computers. And at the step SP32, he enters audio information such as narration using a microphone 66.

The audio information thus entered into the EDL forming device 66 will be edited by the reporter on said EDL forming devices 34A–34N at the step SP33, and registered as audio file in the external memory device formed of a hard disc device added to said EDL forming devices 34A–34N.

Moreover, at the step SP34, the EDL forming devices 34A–34N, accessing to the database in the external memory device 35 provided in the system control unit (host computer) 26, register the audio file and output the audio file transfer request to the system control unit 26. At this point, at the step SP35, the system control unit 26 controls the switch circuit provided on the input terminal of the daily server 30, and by securing the area and the recording port of the daily server 30, conducts the recording preparation of audio data D60 to said daily server 30. When this preparation is completed, the system control unit 26 informs the completion of said preparation to the EDL forming devices 34A–34N.

Thus, at the step SP36, the EDL forming devices 34A–34N transmit the audio file as data via the network, and the audio data D60 transmitted will be recorded on the recording area specified in the server 30D via the recording/reproduction unit 30B (FIG. 9) of the daily server 30 at the step SP37.

In this connection, in the case of registering the audio file on the database in the external memory device 35 of the system control unit 26, the audio data D60 will be also recorded on the clip server 33 of the off-line EDL forming system 22 via the network. Thus, the same audio data D60 is corresponded both in the off-line EDL forming system 22 and the on-line EDL execution output system 24 and recorded, and at the off-line EDL forming system 22, the EDL data will be formed by its contents are being confirmed.

At the step SP38 in FIG. 10, the EDL executors 40A–40C, accessing to the audio video file of the server 30D in the daily server 30 based on the EDL data formed in the on-line EDL forming system 22, edit this audio video file. At the step SP39, when the editing by said EDL executors 40A–40C is terminated, said EDL executors 40A–40C access to the database in the external memory device 35 and register edited file and outputs the transfer request to the system control unit 26.

With this arrangement, at the step SP40, the system control unit 26 conducts the recording preparation by securing the area and recording port of the on-air server 41, and when the preparation is completed, informs the completion of said preparation to the EDL executors 40A–40C. Upon receiving this notice, the EDL executors 40A–40C reproduce the audio file at the step SP41 and record the edited file on the on-air server 41.

According to the foregoing construction, in the news program production broadcasting system 60 (FIG. 7), the audio file formed at the EDL forming devices 34A–34N comprised of personal computers will be combined with images and used for broadcasting. Also, the telephone audio information stored at the EDL forming devices 34A–34N via the modem 61 will be combined with images and used for the purpose of broadcasting.

Thus, according to the foregoing construction, it becomes unnucessary to provide the audio booth and telephone voice recording equipment in addition to the reporter terminal of the conventional device and the construction of the news program production broadcasting system 70 can be simplified.

Moreover, since the audio information exists as the computer file in the news program production broadcasting system 60, it can be transferred to the other system via the network easily.

(5-3) The Third Embodiment

Figure 11:
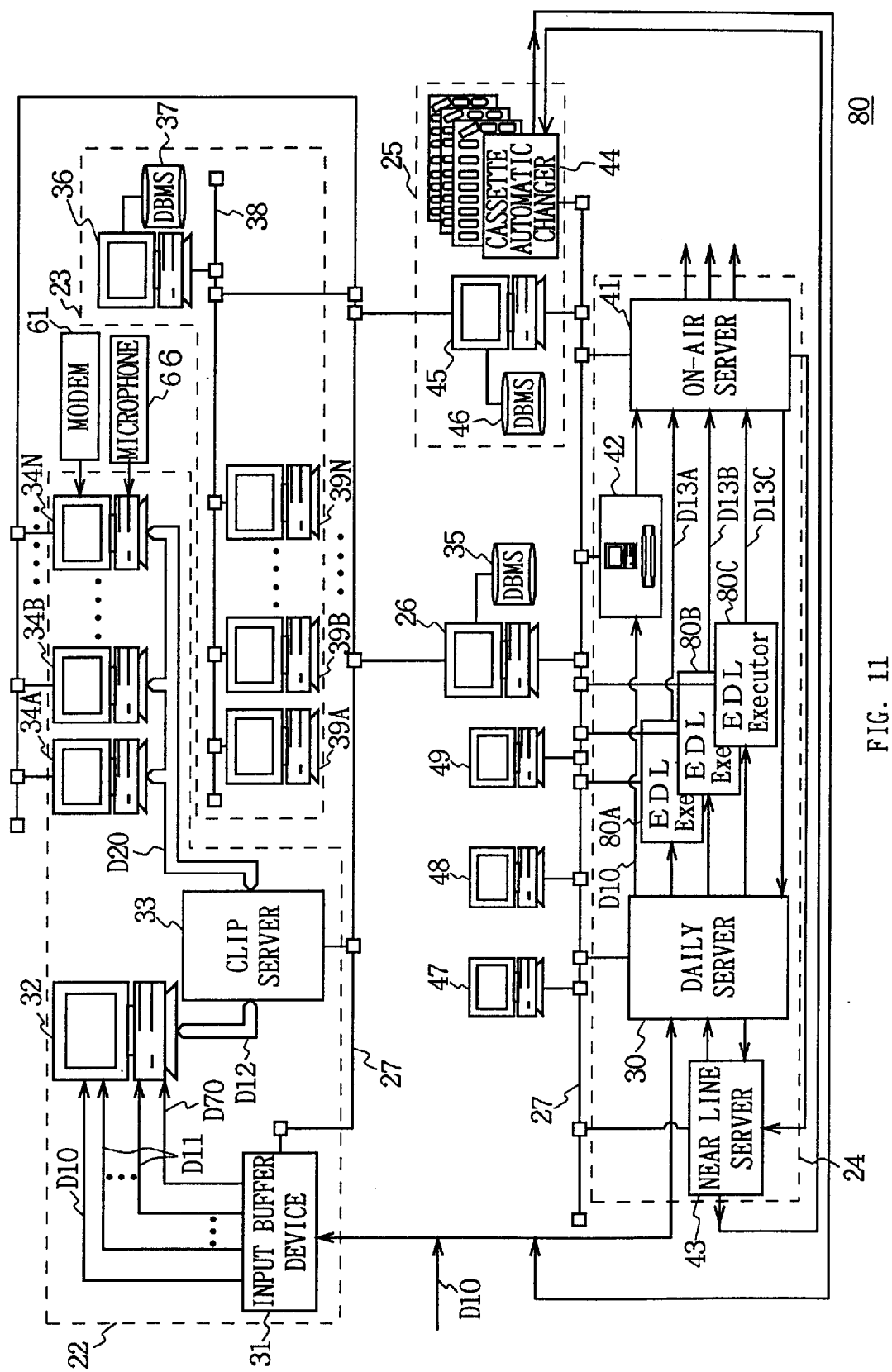
FIG. 11 is a block diagram showing the news program production broadcasting system according to the 3rd embodiment.

FIG. 11, in which the corresponding parts of FIG. 4 are given the same reference numerals, shows a news program production broadcasting system 80 which is capable of combining audio data D60 such as audio narration into the AV data D10, and the audio data entered via a modem 61 or a microphone 66 in the EDL forming devices 34A–34N into the EDL executors 80A–80C as audio file data and combined with the AV data D10 here.

Figure 21:
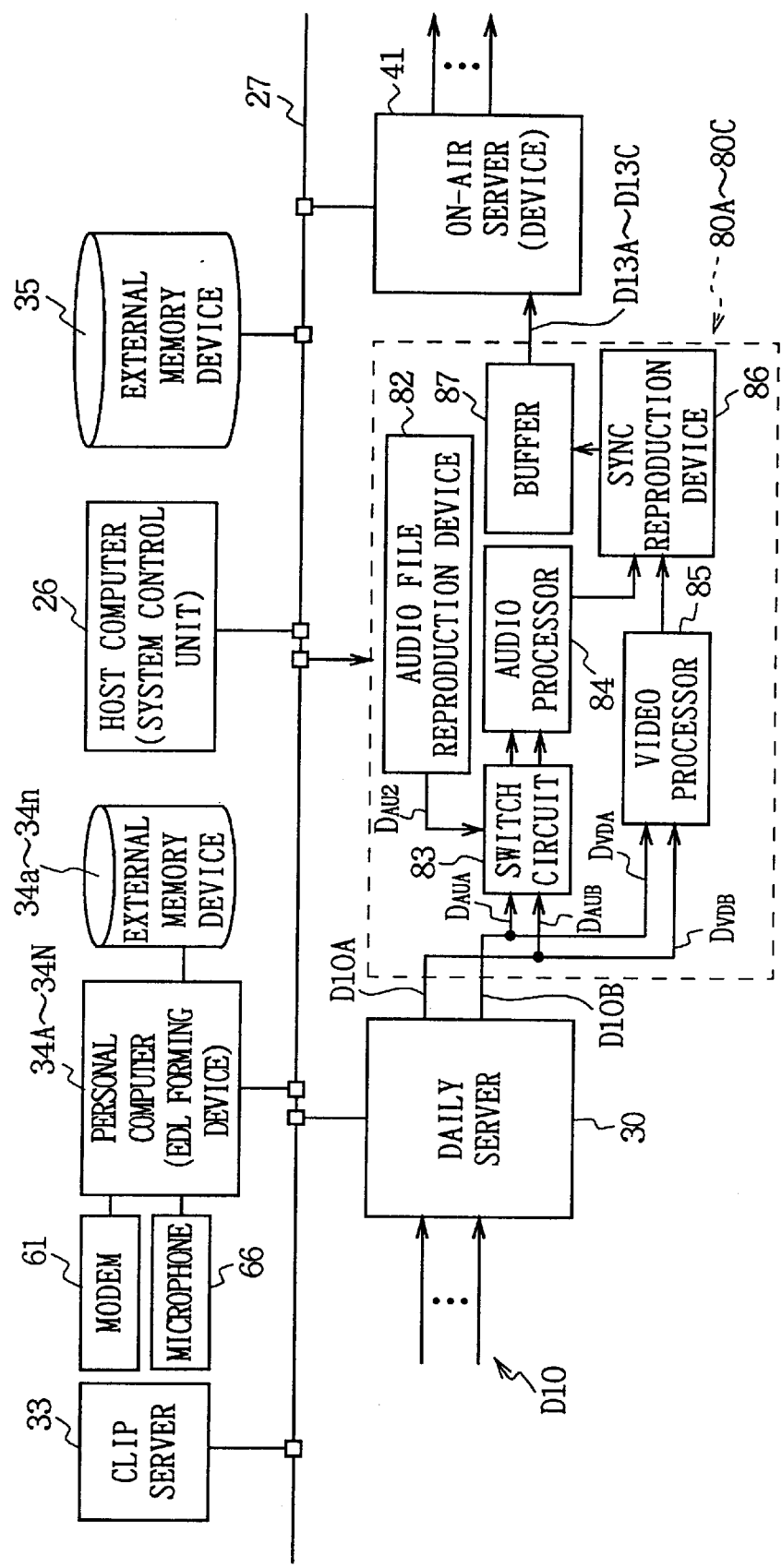
FIG. 21 is a block diagram showing the construction of the EDL execution device according to the 3rd embodiment.

FIG. 21 shows the detailed construction of EDL executors 80A–80C, and the audio file data entered via the network 27 will be converted to audio signal at the audio file reproduction device 82 and transmitted to the switch circuit 83. The switch circuit 83 selects each audio signal DAUA and DAUB of audio video signal D10A and D10B to be sent out from the daily server 30 and audio signal DAU2 reproduced at the audio file reproduction device 82 and outputs to the audio processor 84. The audio processor 84 mixes the output audio signal of the switch circuit 83 and outputs this to the synchronizing reproduction device 86.

On the other hand, each video signal DVDA and DVDB of audio video signal D10 to be sent out from the daily server 30 will be supplied to the video processor 85 respectively and after being edited transmitted to the synchronizing reproduction device 86. The synchronizing reproduction device 86 synchronizes and reproduces video and audio and outputs these to the buffer 87. The buffer 87 outputs the input edited audio video signal to the on-air server 41 as the edited data D13A–D13N.

Figure 12:
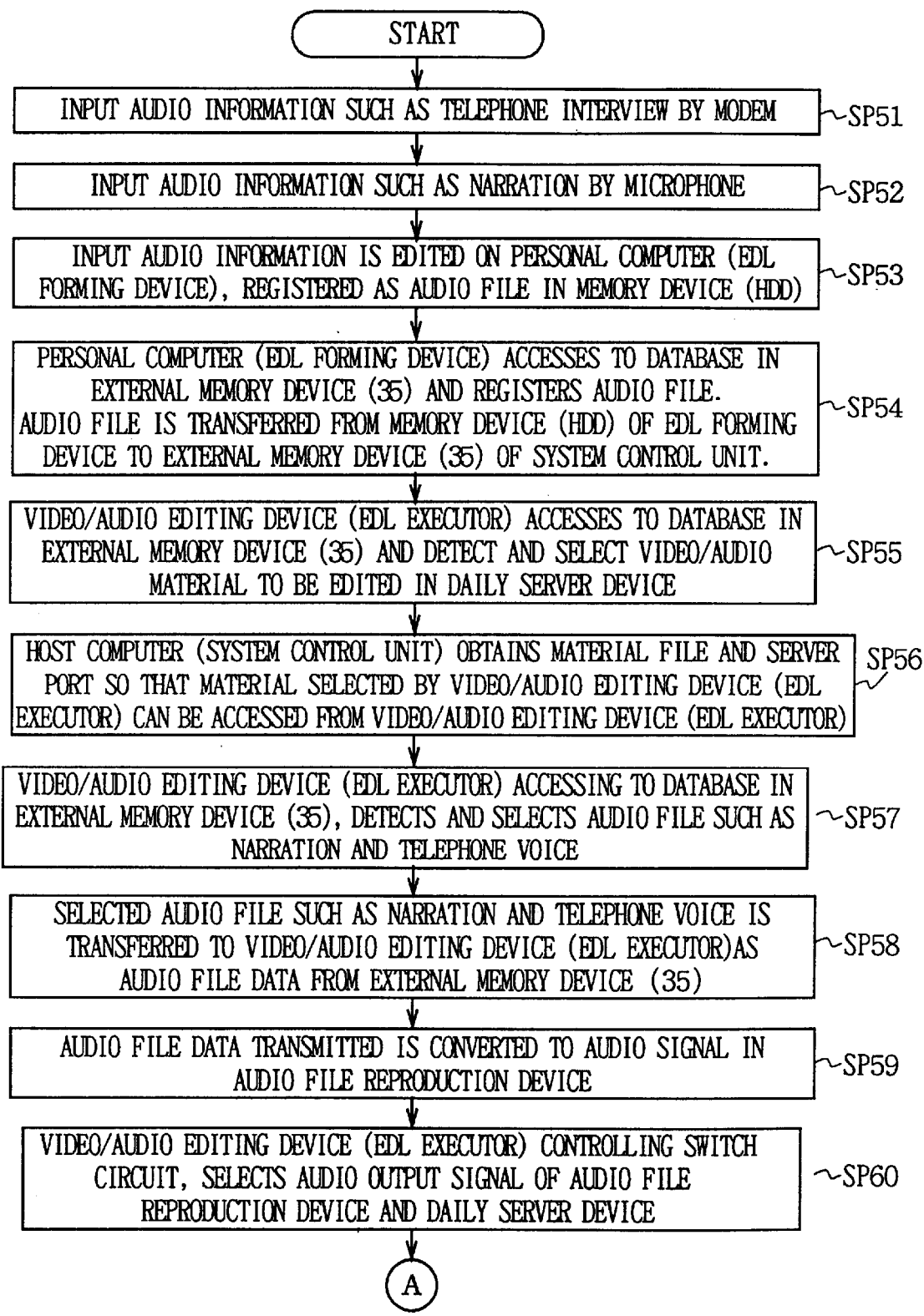
FIG. 12 is a flow chart showing the editing processing procedure according to the 3rd embodiment.
Figure 13:
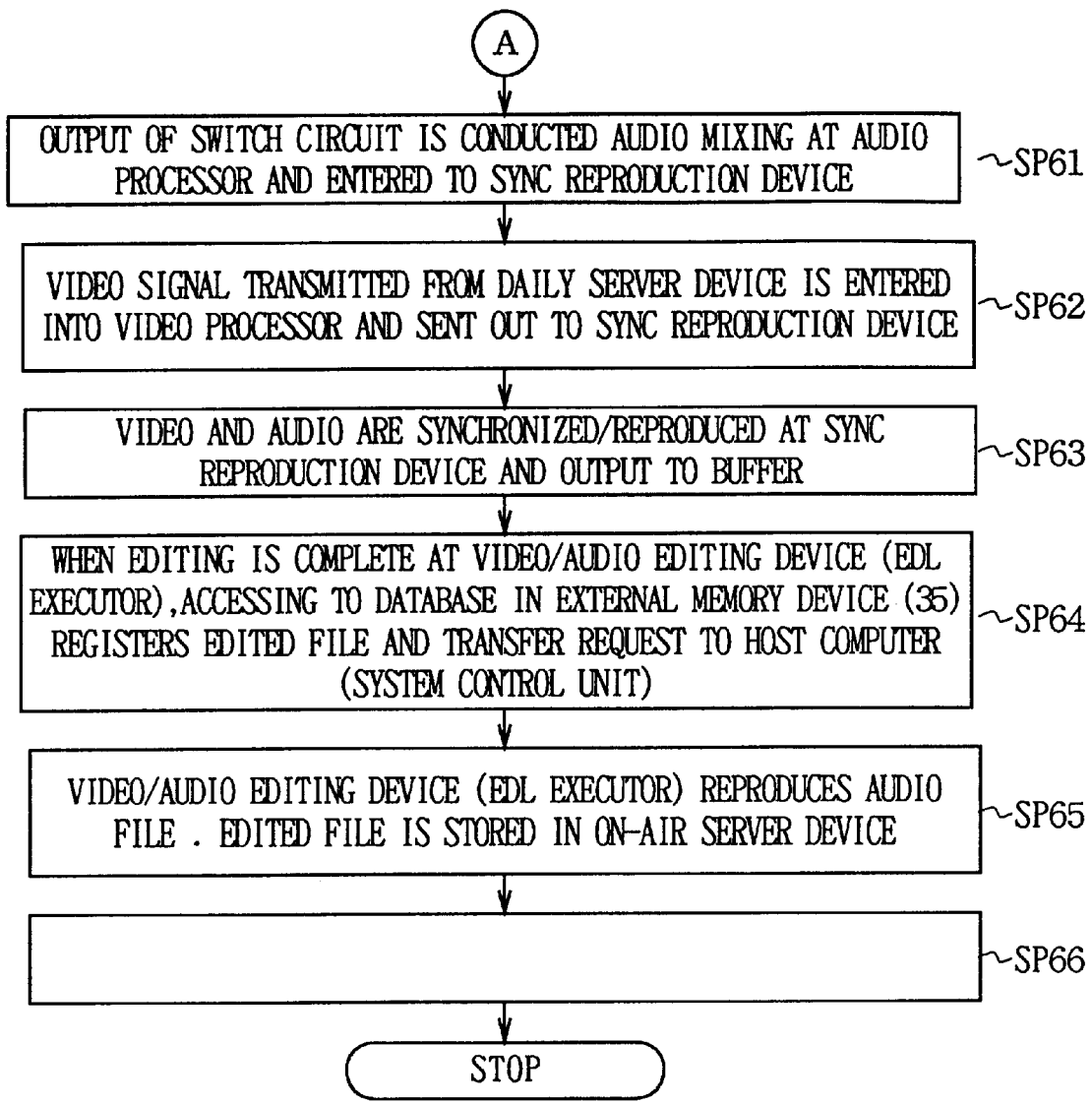
FIG. 13 is a flow chart showing the editing processing procedure according to the 3rd embodiment.

Thus constructed news program production broadcasting system 80 conducts the audio editing according to the processing procedure shown in FIG. 12 and FIG. 13.

More specifically, at the step SP51 in FIG. 12, the reporter enters audio information such as telephone interview into the EDL forming device 34A–34N by means of modem 61 connected to the EDL forming devices 34A–34N comprised of personal computer. And at the step SP52, he enters the audio information such as narration using the microphone 66.

The audio information thus entered into the EDL forming devices 34A–34N will be edited by the reporter on said EDL forming devices 34A–34N at the step SP53 and registered on the external memory devices 34a–34n formed of hard discs (HDD) as the audio file.

Furthermore, at the step SP54, the EDL forming devices 34A–34N, accessing to the database in the external memory device 35 provided in the system control unit(host computer) 26, registers audio file. At this point, the audio file is transferred from the external memory devices 34a–34n of the EDL forming devices 34A–34N to the external memory device 35 of the system control unit 26 and simultaneously transmitted to the clip server 33.

Then, at the step SP55, the EDL executors 80A–80C access to the database of the external memory device 35 based on the EDL data and detect and select the audio/video material to be edited. The system control unit 26 secures the material file and server port so that the material selected at the step SP55 can be accessed from the EDL executors 80A–80C. Thus, at the step SP57, the EDL executors 8OA–80C accessing to the database in the external memory device 35, detects and selects the audio file such as narration and telephone voices.

At the step SP58, the audio file selected is transmitted to the EDL executors 80A–80C from the external memory device 35 via the network 27 as the audio file data. The audio file data transmitted is converted to audio signal DAU2 by the audio file reproduction device 82 of the EDL executors 80A–80C at the step SP59. At the step SP60, this audio signal is transmitted to the switch circuit 83 and being switched to audio signal DAUA and DAUB sent out from the daily server 30, transmitted to the audio processor 84.

At the step SP61, the audio processor 84 mixes multiple audio signal and outputs this to the synchronizing reproduction device 86. At the step SP62, video signal DVDA and DVDB sent out from the daily server 30 will be transmitted to the synchronizing reproduction device 86 via the video processor 85.

Thus, at the step SP63, the synchronizing reproduction device 86 synchronizes and reproduces audio and video and transmits this to the buffer 87. With this arrangement, when the editing at the EDL executors 80A–80C is completed, at the step SP64, the EDL executors 80A–80C access to the database in the external memory device 35 and register the edited file and output the transfer request to the system control unit 26.

Thus, at the step SP65, the system control unit 26 secures the area and recording port of the on-air server 41 and conducts the recording preparation. When the recording preparation is completed, the system control unit 26 informs the completion of preparation to the EDL executors 80A–80C.

Accordingly, at the step SP66, the EDL executors 80A–80C by sending out the edited AV data D13A–D13C to the on-air server 41, the edited file is recorded in the on-air server 41.

According to the foregoing construction, in the news program production broadcasting system 60 (FIG. 7), the audio file formed by the EDL forming devices 34A–34N comprised of personal computers provided as the reporter terminal will be combined with images and utilized for the purpose of broadcasting. Moreover, the telephone audio information recorded via the modem 61 at the EDL forming devices 34A–34N will be combined with images and utilized for the purpose of broadcasting.

Thus, according to the foregoing construction, it becomes unnecessary to provide an audio booth and a telephone voice recording equipment which were necessary in the conventional device in addition to the reporter terminal, and the construction of the news program production broadcasting system 80 can be simplified.

Furthermore, since the audio information exists as computer file in the news program production broadcasting system 60, information can be transmitted easily to the other system via the network.

Moreover, since the audio file formed in the EDL forming devices 34A–34N is transmitted to the EDL executors 80A–80C, it becomes unnecessary to record the audio file in the daily server 30 and thus, the capacity of the daily server 30 can be used for recording the other material.

Similarly, by transmitting the audio file to the EDL executors 80A–80C, the server port of the daily server 30 can be used for other purposes.

(5-4) Other Embodiment

Furthermore, the first–the third embodiments described above have dealt with the case of recording the audio file formed in the EDL forming devices 34A–34N on the clip server 33. However, the present invention is not only limited to this but also the audio file may be recorded on each external memory device (hard disc) 34a–34n of the EDL forming devices 34A–34N.

Furthermore, the first—the third embodiments described above have dealt with the case of applying the present invention to the news program production broadcasting system 20 (60, 70, 80) comprising the off-line EDL forming system 22 for recording the AV data D10 upon high compressing it, and the on-line EDL execution output. system 24 for recording the non-compressed or low compressed AV data D10 as it is. However, the present invention is not only limited to this but also such as the editing device equipped with only the on-line EDL execution output system 24 may be used. In short, any device which inputs the audio signal by the reporter terminal (EDL forming device) and uses the signal as the editing material may be used.

(6) Construction of Input Buffer Device 31 and Clip Server 33

Figure 14:
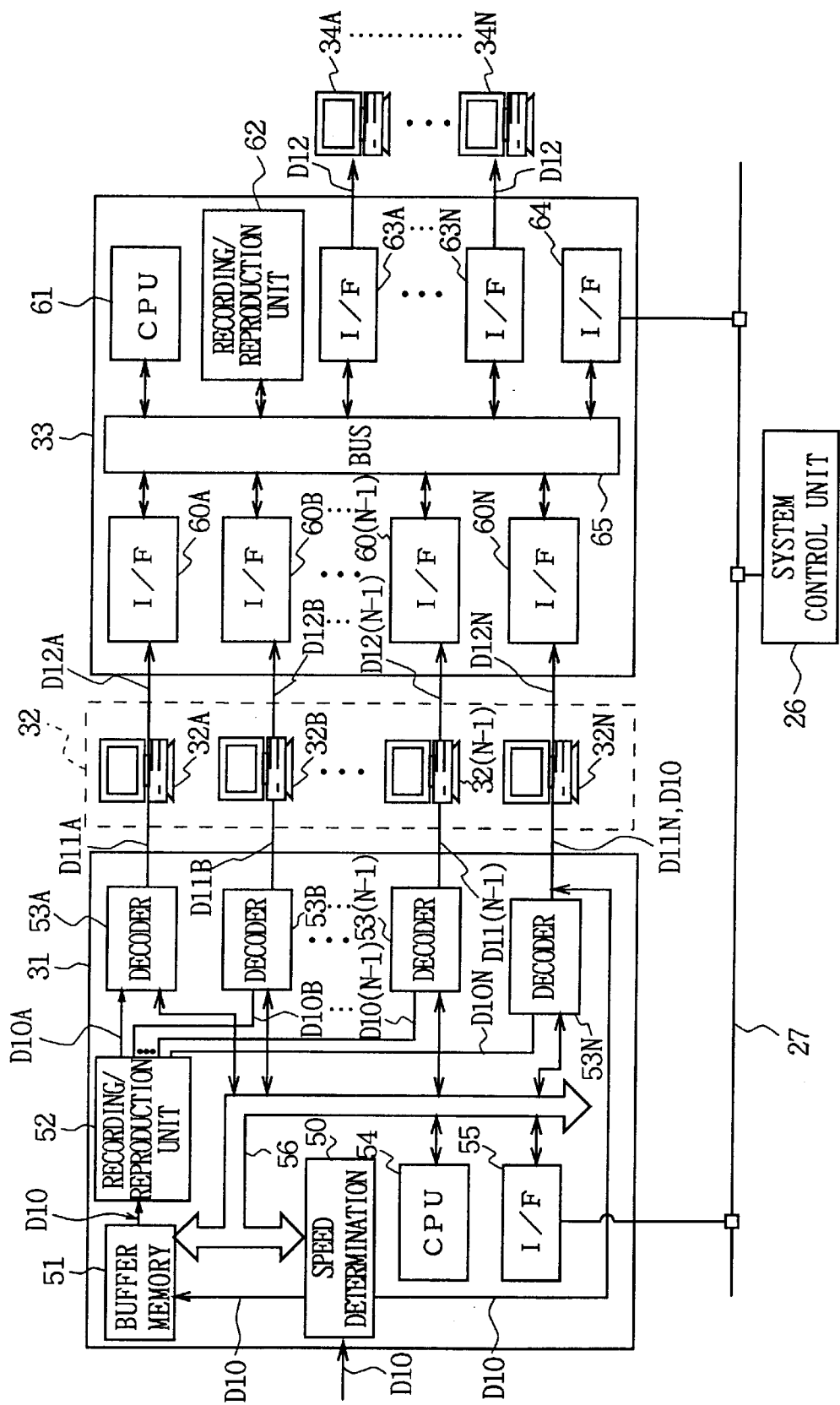
FIG. 14 is a block diagram showing the construction of input buffer device and clip server.

The input buffer 31 is constructed as shown in FIG. 14 connecting to a speed judging circuit 50, a buffer memory 51, a demultiplexer 52, and plural number of decoders 53A–53N, a CPU 54 and an interface circuit 55 via a bus 56.

The CPU 54 is connected to the system control unit 26 successively through the interface circuit 55 and the LAN 27 and able to receive and transmit various kinds of information between the system control unit 26 via the interface circuit 55 and the LAN 27.

In this case, the speed judging circuit 50 judges whether the input AV data D10 is real time speed or high speed, and if said AV data D10 is real time, the speed judging circuit 50 outputs this to the prescribed encoder 32N in the encoder 32 as it is, and on the other hand, if said AV data D10 is high speed, stores this in the buffer memory 51.

At this point, the buffer memory 51 successively reads out the AV data D10 at established time periods under the control of the CPU 54 and transmits this to the demultiplexer 52.

The demultiplexer 52, supposing that the AV data supplied is 1/N compressed data, time divides said AV data D1 into N numbers of files and successively transmits the resulting AV data D10A–D10N of each file to the corresponding decoders 53A–53N respectively under the control of the CPU 54.

Figure 15:
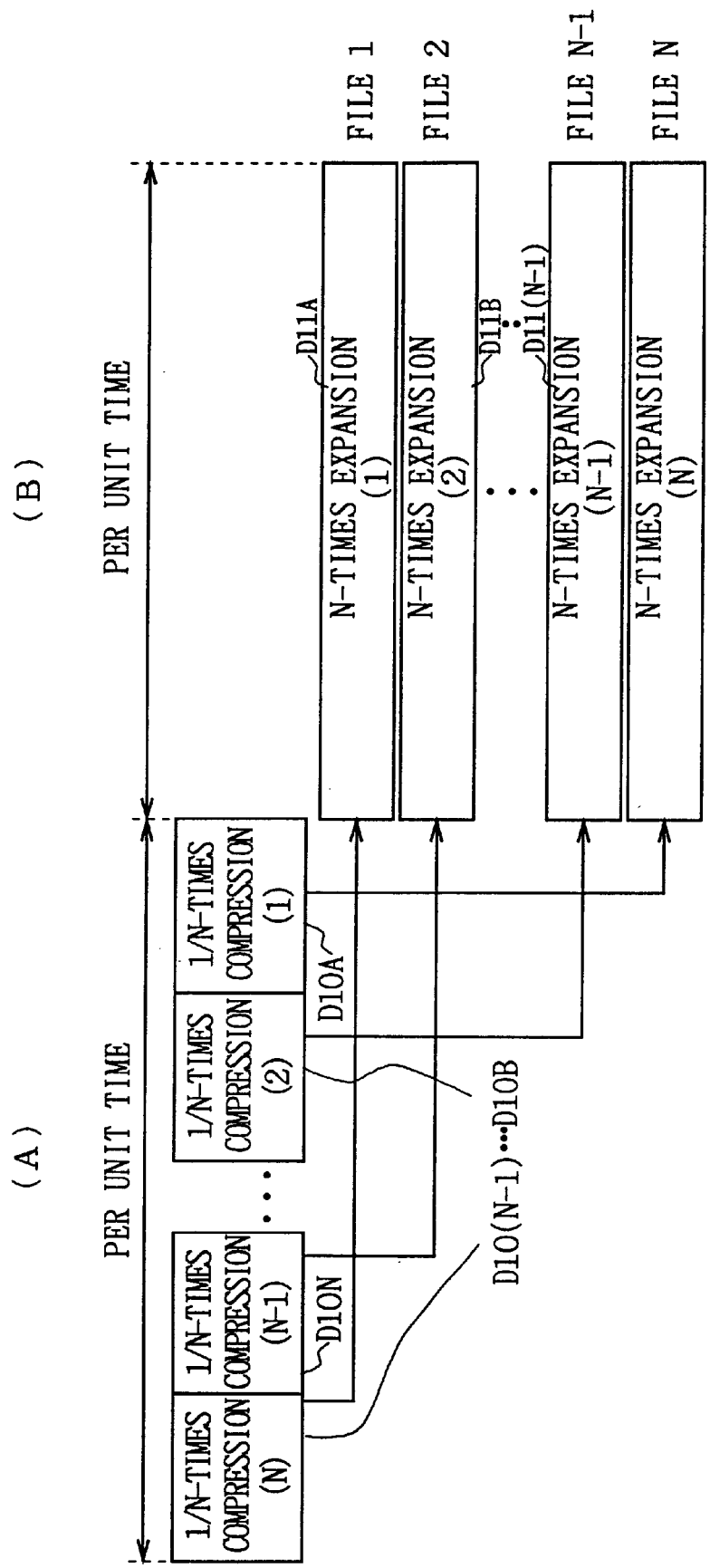
FIG. 15 is a conceptual diagram ilustrating the processing of the input buffer device.

Each decoder 53A–53N, under the control of the CPU 54, by successively decoding AV data D10A–D10N of each file to be supplied, expands these to real time as shown in FIG. 15 (B), and transmits the resulting AV data D11A–D11N to the corresponding encoder 32A–32N of the encoder unit 32.

Then, AV data D10 or each AV data D11A–D11N given to the encoder 32 is high compression coded by each encoder 32A–32N of the encoder unit 32 as described above, and each high compression coded data D12A–D12N obtained will be transmitted respectively to the clip server 33.

The clip server 33 is comprised of the plural number of first interface circuits 60A–60N provided corresponding to each encoder 32A–32N of the encoder unit 32 respectively, the CPU 61, the recording/reproduction unit 62 formed of an array of discs, and the plural number of second interface circuits 63A–63N provided corresponding to each EDL forming device 34A–34N respectively and the third interface circuit 64 and these are connected via the bus 65.

Then, the CPU 61 is connected to the system control unit 26 successively through the third interface circuit 64 and the LAN 17, and thus, the CPU 61 can receive and transmit various information between the system control unit 26 via these interface circuit 64 and the LAN 27.

In this case, each first interface circuit 60A–60N successively captures each high compression coded data 12A–D12N to be supplied under the control of the CPU 61 and outputs this to the recording reproduction unit 62 via the bus 65.

The recording reproduction unit 62 captures each high compression coded data D12A–D12N supplied under the control of CPU 61 and combines and stores these as one file on the specified address position.

And then, when a reproduction request is given to the CPU 61 from either one of EDL forming devices 34A–34N via the system control unit 26, the high compression coded data D12 (FIG. 4) formed of each file data (high compression coded data D12A–D12N) stored in this recording/reproduction unit 62 will be read out from the recording/reproduction unit 62 under the control of said CPU 61 and transmitted to the corresponding EDL forming device 34A–34N.

(7) Operation and Effects of the Present Embodiment

According to the foregoing construction, this news program production broadcasting system 20, as well as storing the AV data D10 to be supplied in the daily server 30, inputs said AV data D10 into the input buffer device 31, and in the case where said AV data D10 is real time speed, stores this upon high compression coding as it is in the clip server 33, while in the case where it is high speed, time dividing this into multiple channels, and upon expanding AV data D11A–D11N of each channel to real time respectively, high compression codes the AV data D11A–D11N of each channel and stores in the clip server 33.

Then, the high compression coded AV data D10 (high compression coded data D12) stored in this clip server 33 can be read out and decoded by the EDL forming devices 34A–34N, and images based on said decoded AV data D10 can be monitor displayed on the EDL forming devices 34A–34N. Moreover, based on this image monitor displayed, the operator can form the EDL using the EDL forming devices 34A–34N.

And then, based on this EDL formed, the EDL executors 40A–40N execute the editing processing by using the non-compressed or low compressed AV data D10 stored in the daily server 30, and the obtained AV data D13A–D13D are registered in the on-air server 41 and reproduced and transmitted at the designated time.

Accordingly, in this news program production broadcasting system 20, when compared to the conventional news program broadcasting system 1 (FIG. 1) as described above, in the case where the first AV server 2 (FIG. 1) and the clip server 33 (FIG. 4) have the same data transmission capacity, more EDL forming devices 34A–34N than the number of editing devices 4A–4N (FIG. 1) which can be connected to the first AV server 2 can be connected to the clip server 33, and thus, many more people can confirm the contents of the AV data D10 obtained by collecting materials and registered in the clip server 33 and the daily server 30 and also many more personnel can form the EDL.

Furthermore, in this news program production broadcasting system 20, since the input AV data D10 can be captured even it is high speed, the demand for instantaneous that is unique to the news program can be responded and for that amount the efficiency of the news program production work and the quality of news video to be obtained by editing can be improved.

According to the foregoing construction, since the AV data D10 to be supplied is memorized and held by the daily server 30, and in the case where said AV data D10 is entered in real time, it is high compression coded and memorized in the clip server 33, while in the case where said AV data D10 is entered at high speed, it is expanded to real time and high compression coded and memorized in the clip server 33, and the EDL will be formed by the EDL forming devices 34A–34N based on the high compression coded AV data D10 (high compression coded data D12) memorized and held in the clip server 33 and based on the obtained EDL the editing processing is conducted by the EDL executors 40A–40C using the non-compressed or low compressed AV data D10 memorized in the daily server 30, the AV data D10 entering at high speed can be captured and at the same time more people can confirm the contents of the AV data D10 obtained by collecting materials, and EDL can be formed by many more personnel and thereby, the news program production broadcasting system capable of improving the efficienty of program production work can be realized.

(8) Other Embodiment

Furthermore, the embodiment described above has dealt with the case of applying the daily server 30 formed of AV server having the recording/reproduction unit formed by an array of discs as the first memory means for memorizing the non-compressed or low compressed AV data D10 to be entered at the high speed. However, the present invention is not only limited to this but also various other memory means can be applied.

Furthermore, the embodiment described above has dealt with the case of constructing the input buffer device 31 as the input buffer means for expanding the AV data D10 to be entered at the high speed to the real time. However, the present invention is not only limited to this but various other constructions can be applied. In this case, the input buffer means, by successively expanding the AV data D10 entering at the high speed to the real time, it may transmit the AV data D11 expanded to the real time to the encoder 32 via one channel.

Furthermore, the embodiment described above has dealt with the case of constructing the second memory means for high compressing and memorizing the AV data D11 expanded by the input buffer device 31 by the encoder 32 constructed as shown in FIG. 14 and the clip server 33 having the recording/reproduction unit 62 comprising an array of discs (FIG. 14). However, the present invention is not only limited to this but also various other constructions can be applied.

Moreover, the embodiment described above has dealt with the case of applying the EDL forming devices 34A–34N comprising personal computers as the editing execution order list forming means capable of forming EDL based on the high compressed AV data D10 (high compression coded data D20) memorized in the clip server 33. However, the present invention is not only limited to this but also various other constructions can be applied.

Furthermore, the embodiment described above has dealt with the case of constructing the editing execution order list executing means for editing the non-compressed or low compressed AV data D10 memorized and held in the daily server 30 by the system control unit 26 which controls the overall control of the news program production broadcasting system 20 and the plural number of EDL executors 40A–40C. However, the present invention is not only limited to this but also the control unit to control the operating condition of the EDL executors 40A–40C based on the EDL formed may be provided in addition to the system control unit 26, and as the construction of the editing execution order list executing means various other constructions can be applied.

Furthermore, the embodiment described above has dealt with the case of applying the present invention to the news program production broadcasting system 20 for producing and broadcasting the news program. However, the present invention is not only limited to this but also it can be applied to the various other signal processing devices for editing input video signals.

(9) Construction of Daily Server 30 and Clip Server 33

Figure 16:
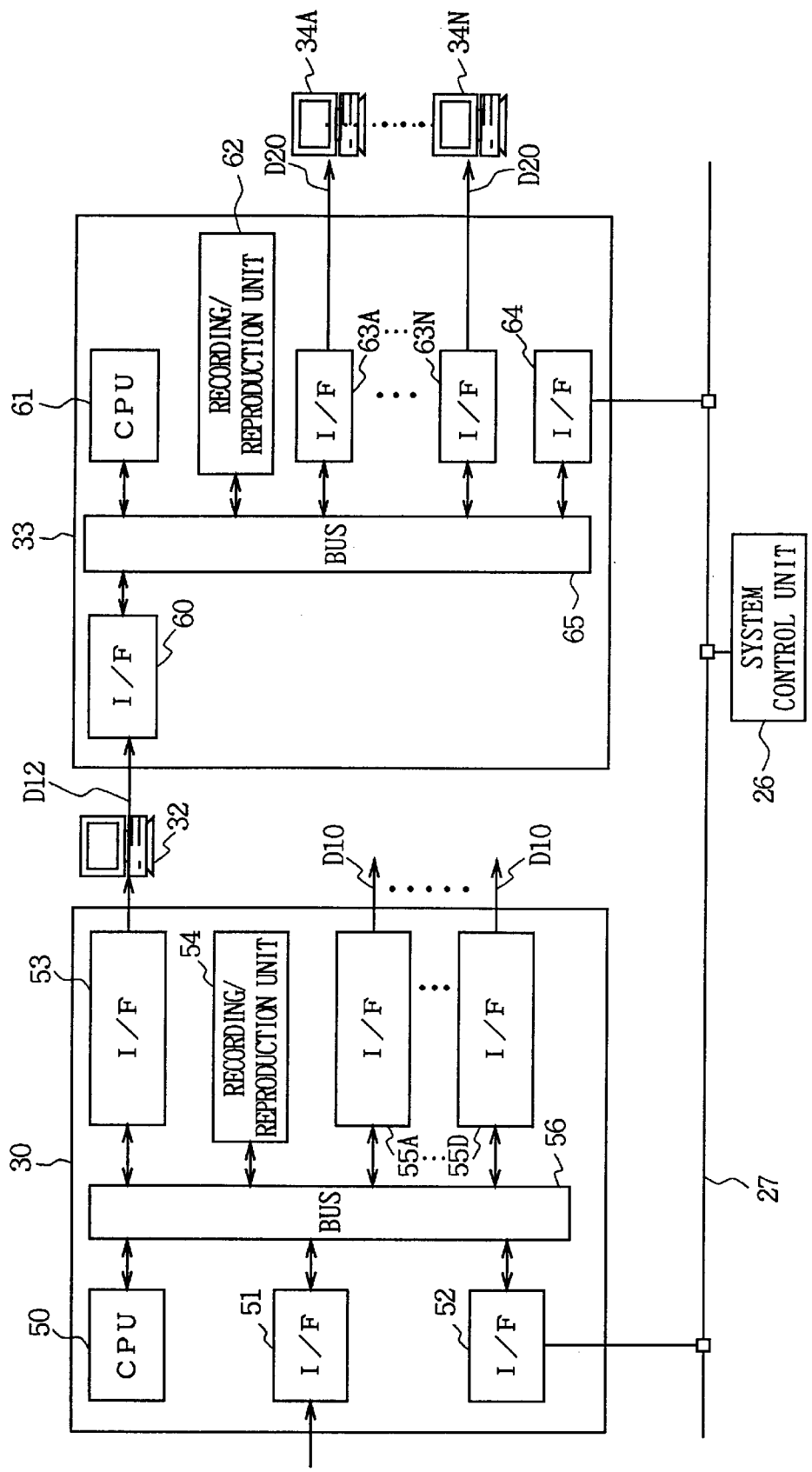
FIG. 16 is a block diagram showing the construction of daily server and clip server.

At this point, as shown in FIG. 16, the daily server 33 is constructed by a CPU 50, the first, the second and the third interface circuits 51, 52, 53, and a recording/reproduction unit 54 formed of an array of discs, and the third interface circuits 55A–55D connected to the editing device 42 or EDL executors 40A–40C are connected via a bus 56.

Then, the CPU 50 is connected to the system control unit 26 successively through the second interface circuit 52 and the LAN 27, and can receive and transmit various kinds of information between the system control unit 26 via these second interface circuit 52 and LAN 27.

In this case, the first interface circuit 51 successively captures the AV data D10 entering under the control of the CPU 54 and transmits this to the recording/reproduction unit 54 via the bus 56.

The recording/reproduction unit 54 successively captures the AV data D10 to be supplied and stores this on the specified address position under the control of CPU 50. Moreover, at this point, if this AV data D10 enters at higher speed than the real time speed, the recording/reproduction unit 54, writing this in, immediately reads out and transmits this to the third interface circuit 53 via the bus 56.

The third interface circuit 53 expands the AV data D10 to be supplied to the real time by successively decoding this, and transmits the resultant AV data D11 to the encoder unit 32 as described above.

Then, this AV data D11 is captured into the encoder unit 32 under the control of the system control unit 26 and successively high compression coded. And the resultant high compression coded data D12 will be transmitted to the clip server 33.

The clip servier 33 is constructed by the first interface circuit 60, the CPU 61, the recording/reproduction unit 62 formed of an array of discs, and the plural number of second interface circuits 63A–63N provided respectively corresponding to each EDL forming device 34A–34N, and the third interface circuit 64 which are connected via the bus 65.

And the CPU 61 is connected to the system control unit 26 through the third interface circuit 64 and the LAN 27, and the CPU 61 can receive and transmit various kinds of information to and from the system control unit 26 via these interface circuit 64 and LAN 27.

In this case, the first interface circuit 60 successively captures the high compression coded data D12 to be supplied from the encoder unit 32 under the control of CPU 61, and outputs this to the recording reproduction unit 62 via the bus 65. Moreover, the recording reproduction unit 62 successively captures the high compression coded data D12 to be supplied under the control of the CPU 61 and stores this on the address position specified as a file.

Then, when the reproduction request from either one of EDL forming devices 34A–34N is given to the CPU 61 via the system control unit 26, each file data stored in this recording reproduction unit 62 (high compression coded data D20 formed of high compression coded data D12) will be read out from the recording reproduction unit 62 under the control of said CPU 61 and transmitted to the corresponding EDL forming device 34A–34N.

(10) Operation and Effects of the Present Embodiment

According to the foregoing construction, in this news program production broadcasting system 20, the AV data D10 to be supplied will be successively stored in the daily server 30 and in the case where said AV data D10 enters at higher speed than the real time speed, this is read out from the recording reproduction unit 54 of the daily server 30 and after being expanded to the real time at the interface circuit 53, transmitted and stored in the clip server 33 after being high compression coded at said encoder unit 32.

The high compression coded AV data D10, D11 (high compression coded data D12) can be read out and decoded by the EDL forming devices 34A–34N and images based on said decoded AV data D10 can be monitor displayed in the EDL forming devices 34A–34N. Moreover, the operator can form EDL using the EDL forming devices 34A–34N based on the images monitor displayed.

Then, based on thus formed EDL the EDL executors 40A–40N execute the editing processing using the non-compressed or low compressed AV data D10 stored in the daily server 30, and the resultant AV data D13A–D13D will be registered in the on-air server 41 and reproduced and transmitted at the specified time.

Accordingly, in this news program production broadcasting system 20, as described above, comparing to the conventional news program production broadcasting system 1 (FIG. 1), in the case where the first AV server 2 (FIG. 1) and the clip server 2 have the same data transfer capacity, more EDL forming devices 34A–34N than the number of editing devices 4A–4N (FIG. 1) which can be connected to the first AV server 2 can be connected to the clip server 33, and thus, more people can confirm the contents of the AV data D10 obtained by collecting materials and registered on the clip server 33-and the daily server 30, and the EDL can be formed by many more personnel.

Furthermore, in this news program production broadcasting system 20, since the input AV data D10 can be captured even it is high speed as described above, the demand for immediacy, that is a unique feature of the news program production work, can be responded and the efficiency of the news program production work and the quality of news video to be obtained by editing can be improved.

According to the foregoing construction, since the AV data D10 to be supplied will be successively stored in the daily server 30, and when said AV data D10 is entered at higher speed than the real time speed, the AV data D10 stored in the daily server 30 will be read out, expanded to the real time and high compression coded at the encoder unit 32 and stored in the clip server 33, and EDL will be formed by the EDL forming devices 34A–34N based on the high compression coded AV data D10 (high compression coded data D12) stored in the clip server 33, and based on the resulting EDL the editing processing will be conducted by the EDL executors 40A–40C using the non compressed or low compressed AV data D10 stored in the daily server 30, the av data D10 entering in high speed can be captured and more people can confirm the contents of the AV data obtained by collecting materials and the EDL can be formed by many more personnel. Thereby, the news program production broadcasting system capable of improving the efficiency of program production work can be obtained.

(11) Other Embodiment

Furthermore, the embodiment described above has dealt with the case of applying the daily server 30 constructed as shown in FIG. 16 as the first memory means which successively memorizes the non-compressed or low compressed AV data D10 to be entered at higher speed than the real time, reads out said memorized video signal and expanding to the real time, outputs this. However, the present invention is not only limited to this but also memory means having various other constructions can be applied.

Furthermore, the embodiment described above has dealt with the case of constructing the second memory means for memorizing upon memorizing the AV data D11 expanded to the real time to be put out from the daily server 30 with the decoder unit 32 and the clip server 33 having the recording reproduction unit 62 formed of an array of discs shown in FIG. 16. However, the present invention is not only limited to this but also various other construction can be applied.

Moreover, the embodiment described above has dealt with the case of applying the EDL forming devices 34A–34N comprised of personal computers as the editing execution order list forming means capable of forming the EDL based on the high compressed AV data D10 (high compression coded data D20) stored in the clip server 33. However, the present invention is not only limited to this but also the other device having various other constructions can be applied.

Furthermore, the embodiment described above has dealt with the case of constructing the editing execution order list executing means for editing the non-compressed or low compressed AV data D10 stored in the daily server 30 based on the EDL formed in the EDL forming-devices 34A–34N by the system control unit 26 for controlling the overall control of the news program production broadcasting system 20 and the plural number of EDL executors 40A–40C. However, the present invention is not only limited to this but also such as a control unit to control the operating condition of the EDL executors 40A–40N based on the EDL formed may be provided in addition to the system control unit 26, and as the construction of the editing execution order list executing means, various other constructions can be applied.

Furthermore, the embodiment described above has dealt with the case of applying the present invention to the news program production broadcasting system 20 for producing and broadcasting the news program. However, the present invention is not only limited to this but also it can be applied to various other signal processing device for editing the input video signal.

Moreover, the embodiment described above has dealt with the case of the daily server 30 writing the AV data D10 in the recording reproduction unit 54 (FIG. 16) and immediately reading it out and expanding to the real time at the third interface circuit 53 (FIG. 16) and outputting when the input AV data D10 is higher speed than the real time speed.

However, the present invention is not only limited to this but also, when the input AV data D10 is higher speed than the real time speed, the daily server 30, after storing all of said AV data D10 in the recording reproduction unit 54 (FIG. 16) reads them out successively and expands to the real time at the third interface circuit 53, and the resulting AV data D11 may be transmitted to the encoder unit 32.

(12) Schedule Management by the System Control Unit

Next, in this chapter the schedule management of editing processing to be conducted by the system control unit 26 will be explained. This schedule management is roughly divided into two kinds; one is the work to allocate EDL registered to the EDL executors, and the other one is the work to allocate the server output to the EDL executors. This point will be successively described with reference to drawings in the following. In the following explanations, provided that 4 EDL executors 40A–40N are connected to the daily server 30.

Figure 17:
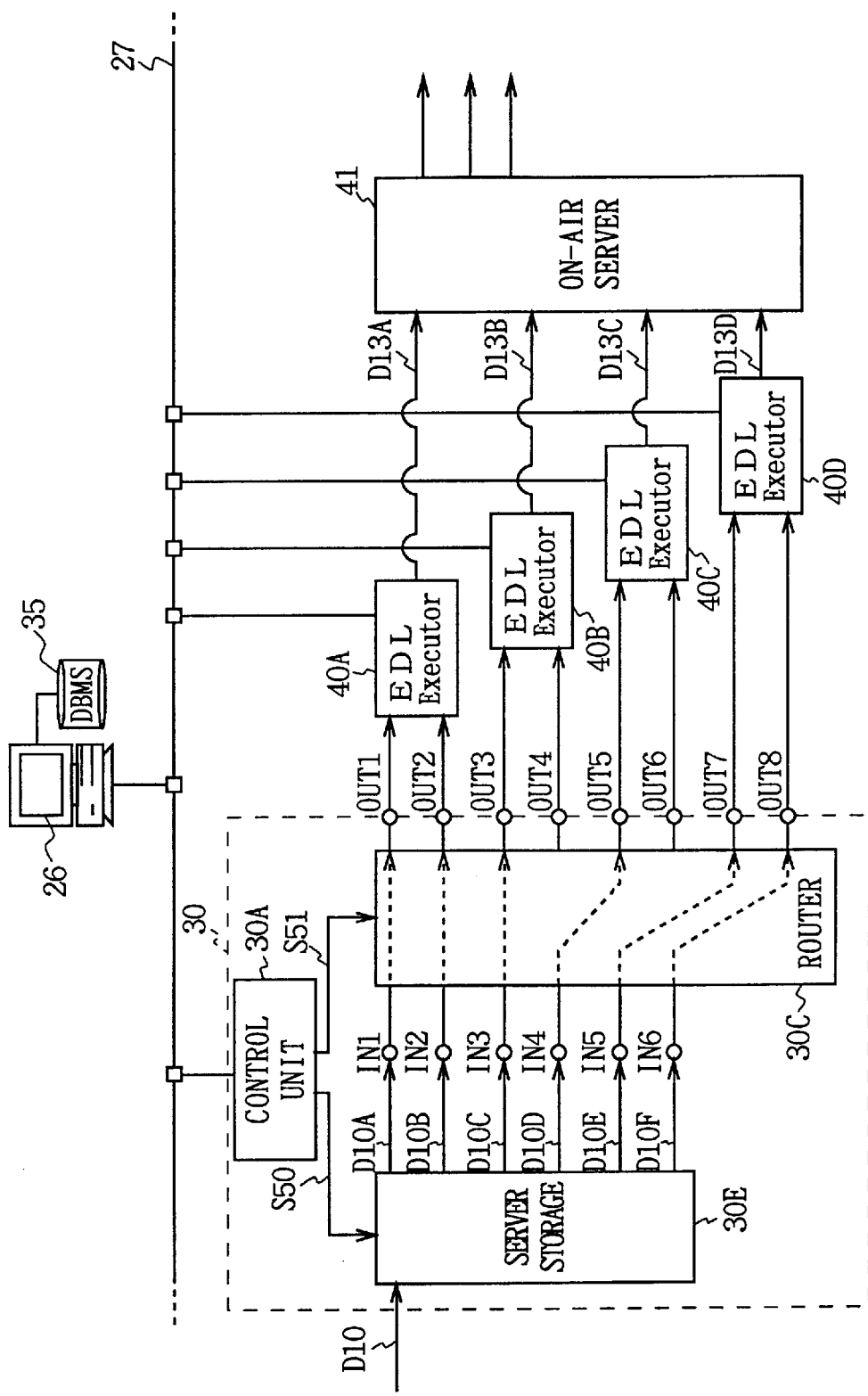
FIG. 17 is a block diagram illustrating the internal construction of the daily server.

At first, the internal construction of the daily server 30 will be explained referring to FIG. 17. In FIG. 17, in which the corresponding parts of FIG. 4 are given the same reference numerals, 30 generally shows a daily server and this is roughly comprised of a control unit 30A, a server storage 30E and a router 30C.

The control unit 30A is a control means for controlling the operation of this daily server 30, and receives the server output allocation command and the data recording command from the system control unit 26 or the data reproduction command from the EDL executors 40A–40D, and based on these commands, the control unit 30A controls the operations of the server storage 30E and the router 30C. For example, to the server storage 30E, by outputting control signal S50 according to the data recording command from the system control unit 26, the control unit 30A instructs the recording operation of the AV data D10. Moreover, to the server storage 30E, by outputting the control signal S50 according to the data reproduction command from the EDL executors 40A–40D, instructs the reproduction operation of the AV data D10. Also to the router 30C, by outputting the control signal S51, it instructs the switching operation of the signal route responding to the server output allocation command from the system control unit 26.

The server storage 30E is a recording reproduction unit comprising the recording medium formed of an array of multiple hard discs, and receiving the control signal S50 from the control unit 30A, it records the AV data D10 to be entered on the desired area of that recording medium. Moreover, the server storage 30E, receiving the control signal S50 from the control unit 30A, reads out the desired part of the AV data D10 from that recording medium, outputs this as the AV data 10A (or D10B–D10F). In an example shown in FIG. 2, the server storage 30E has six output ports and 6 kinds of AV data D10A–D10F can be reproduced simultaneously and outputted independently. Six output ports of the server storage 30E are connected respectively to the input terminals IN1–IN6 of the router 30C and by which the reproduced AV data D10A–D10F can be entered into the router 30C.

The router 30C is a signal route switching means comprising multiple signal routes inside, and upon receiving the control signal S51 from the control unit 30A by selecting the desired signal route from-among multiple signal routes, can output AV data D10A–D10F entered in the input terminals IN1–IN6 to the desired output terminal OUT1–OUT8. More specifically, in the router 30C, the input signal route connected to the input terminals IN1–IN6 and the output signal route connected to the output terminals OUT1–OUT8 are arranged in matrix and the desired input signal route and the desired output signal route can be connected at the cross point at which the input signal route and the output signal route intersect. And thus, AV data D10A–D10F entered into the input terminals IN1–IN6 can be output to the desired output terminal OUT1–OUT8.

Figure 2:
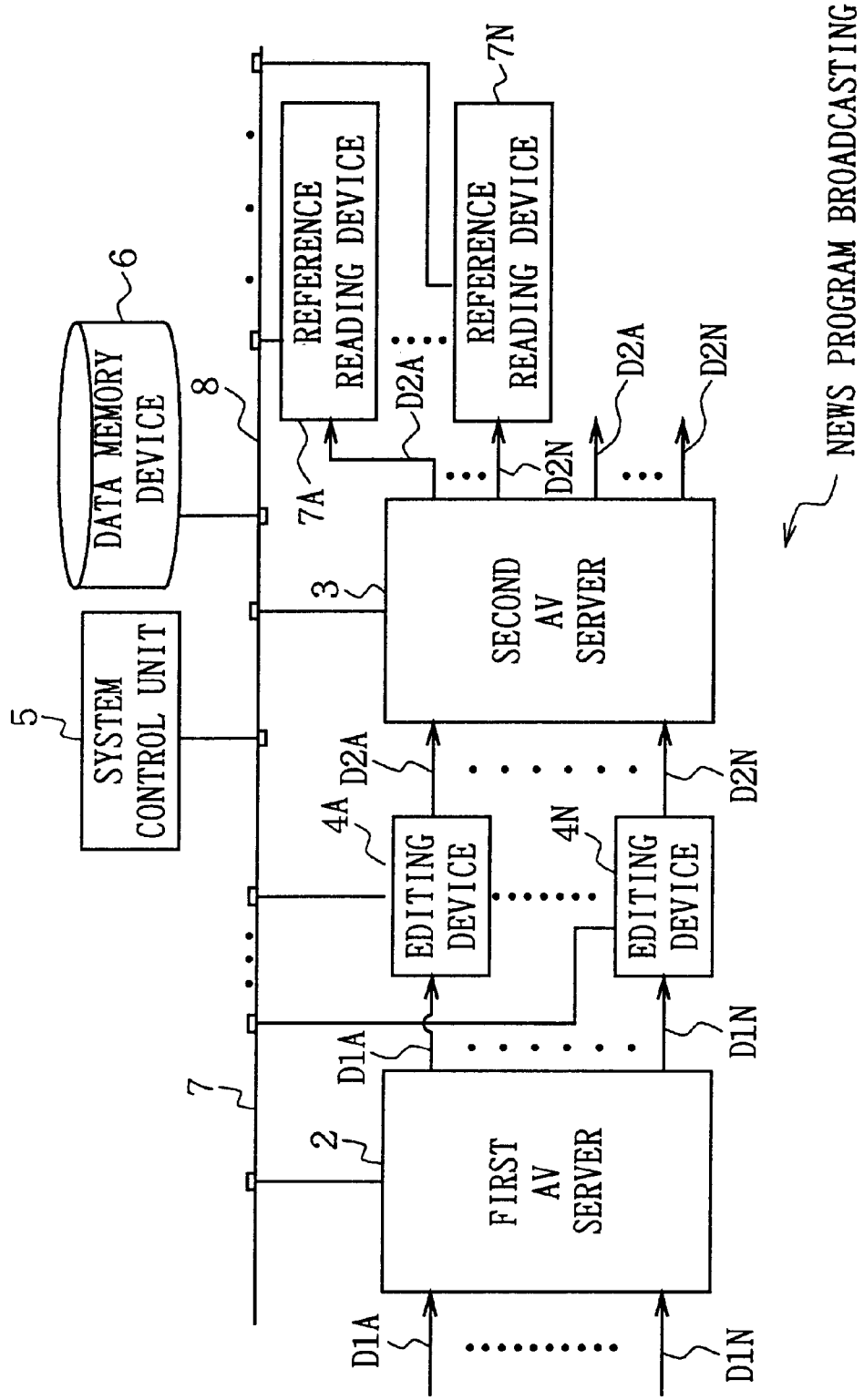
FIG. 2 is a block diagram showing the construction of a conventional news program production broadcasting system.
Figure 3:
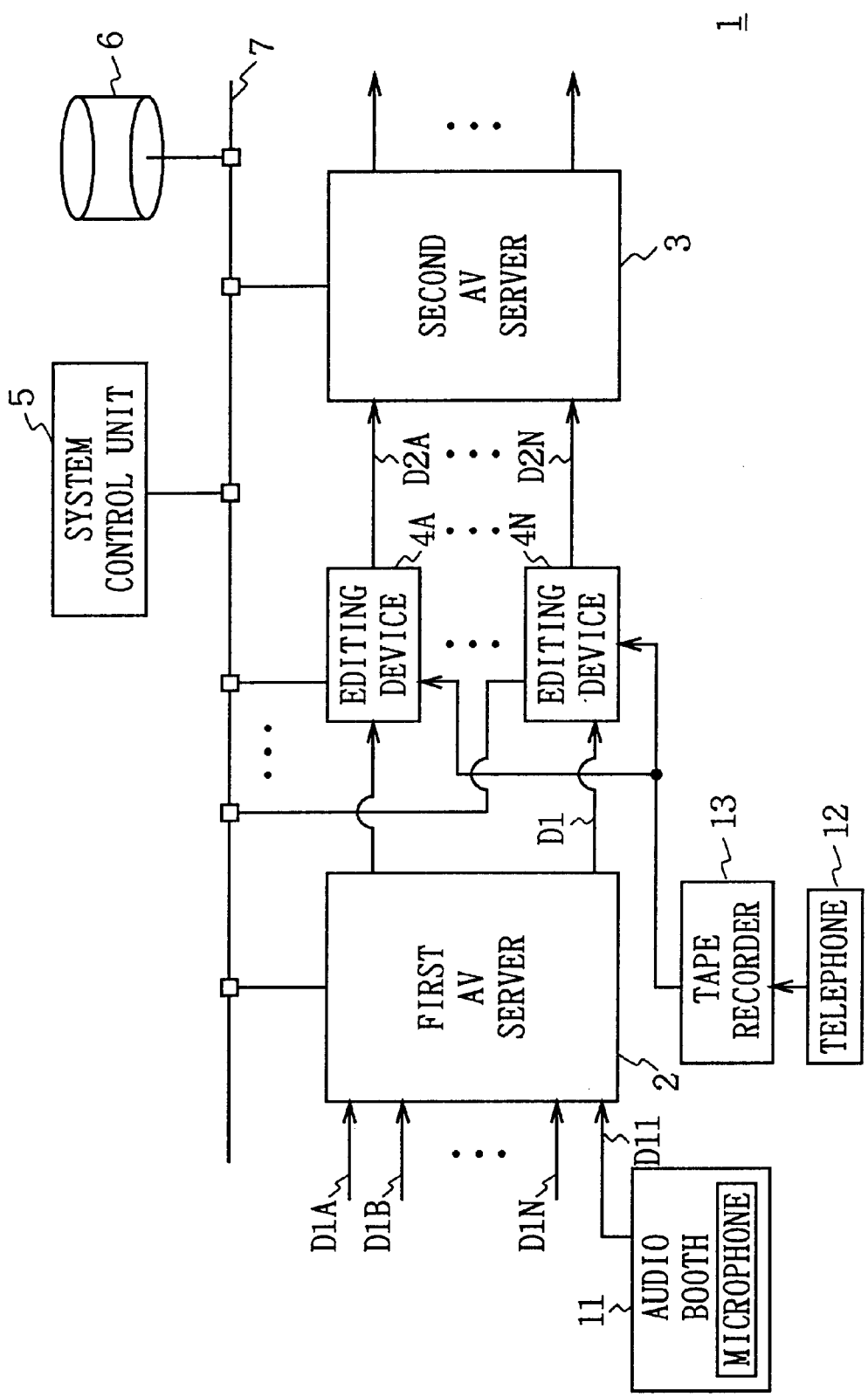
FIG. 3 is a block diagram showing a conventional news program production broadcasting system.

The output terminals OUT1–OUT8 of the router 30C are also output terminals of the daily server 30 and in the example shown by FIG. 2, of these output terminals OUT1–OUT8, the output terminals OUT1 and OUT2 are connected to the EDL executor 40A, the output terminals OUT3 and OUT4 are connected to the EDL executor 40B, the output terminals OUT5 and OUT6 are connected to the executor 40C and the output terminals OUT7 and OUT8 are connected to the executor 40D.

Therefore, if the signal routes would be controlled by the router 30C as described above, such as shown by dotted lines in FIG. 17, by allocating two (2) output ports of the server storage 30E to the EDL executor 40A, the AV data D10A and D10B can be supplied to the executor 40A, and by allocating one (1) output port of the server storage 30E to the EDL executor 40B, the AV data D10C can be supplied to said EDL executor 40B, and by allocating one (1) output port of the server storage 30E to the EDL executor 40C, the AV data D10D can be supplied to said EDL executor 40C, and by allocating two (2) output ports of the server storage 30E to the EDL executor 40D, the AV data D10E and D10F can be supplied to said EDL executor 40D. In this connection, the signal supplying example shown by dotted lines is an example and the other signal supplying example would be possible.

The EDL executors 40A–40D, editing the AV data reproduced from the daily server 30 based on the EDL to be supplied from the system control unit 26 respectively, conducts the editing processing conforming to the editing contents which said EDL shows, and outputs the resulting AV data D13A–D13D respectively to the on-air server 41. In this case, the EDL executors 40A–40D are adapted to conduct various kinds of editing processings based on the EDL, as the typical editing processing, there are such as voice split editing and voice over editing as the audio signal editing processing, or the image effect editing to apply a special effect editing such as mosaic and page turn or wipe to the image signal.

Furthermore, the EDL executors 40A–40D, when 2 server outputs are given simultaneously by the server output allocation conducted under the control of the system control unit 26 (i.e., 2 AV data are entered), in the case of conducting A/B roll editing (i.e., switch editing and insert editing or overlap editing), conducts the editing processing real time using 2 AV data to be entered. Moreover, when one server output is allocated by the server output allocation conducted under the control of the system control unit 26, in the case of editing the A/B roll editing, the EDL executor 40A–40D read out the necessary 2 AV data in due order and stores the AV data entered the first in the buffer and by using the following AV data to be entered next and the AV data stored, the EDL executor 40A–40D conduct the editing processing non real time.

At this point, in this news program production broadcasting system 20, the editing processing executing plan, i.e., the schedule is controlled by the system control unit 26 as described above, and based on this management, as well as allocating the EDL registered to each EDL executor 40A–40D, it allocates the server output to each EDL executor 40A–40D. In an external memory device 35 connected to the system control unit 26 the program called as EDL execution management manager is stored and when the system control unit 26 gets started up, this program up roads to the memory area in said system control unit 26. Thus, in the system control unit 26, the EDL execution management manager gets started and the scheduling work of the editing processing will be conducted by said EDL execution management manager.

This EDL execution management manager reads out the on-air list stored in the external memory device 35 and the execution priority order information showing the execution priority order of the EDL registered by the operator in advance and based on the on-air list read out and execution priority order information, registers the registered EDLs arranging according to the output schedule time or execution priority order onto the EDL execution schedule list (this list shows the final priority order of the EDL execution). Then, the EDL execution management manager conducts the EDL allocation work by allocating EDL executors 40A–40D to the EDL registered in the EDL execution schedule list according to the execution priority order and simultaneously, allocates the output ports of the server storage 30E, i.e., server outputs, to the EDL executors 40A–40D according to the editing contents shown by the EDL and the execution priority order of the EDL. Then, after such allocation work, the EDL execution management manager transmits the EDL data to the EDL executors 40A–40D and makes said EDL executors 40A–4OD conduct the editing processing.

Figure 18:
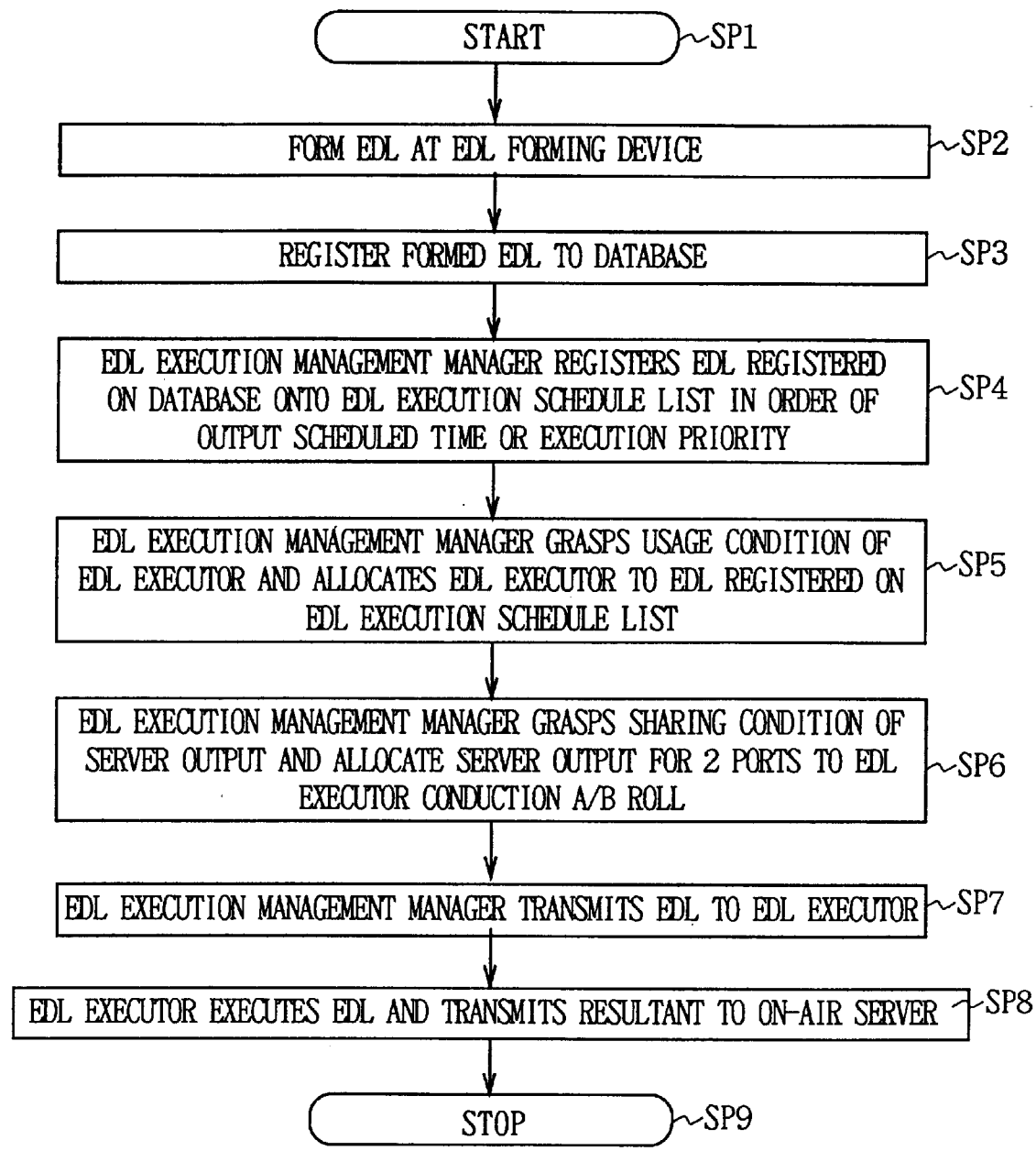
FIG. 18 is a flow chart illustrating the scheduling in the case of executing the A/B roll.
Figure 19:
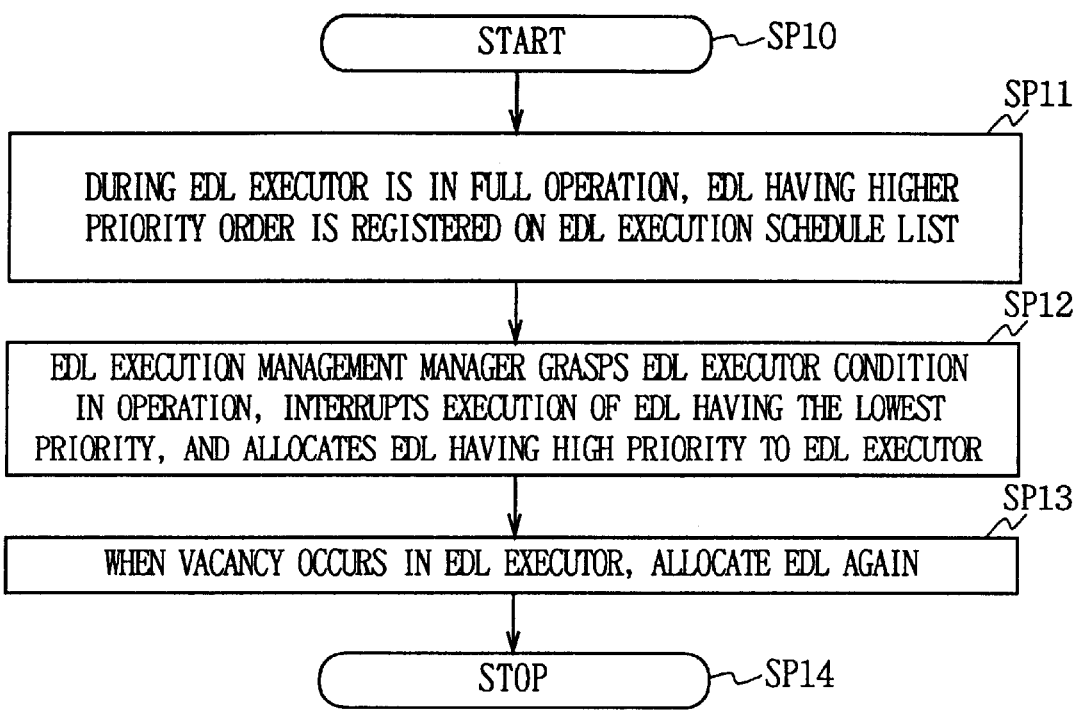
FIG. 19 is a flow chart illustrating the scheduling in the case of executing the interruption processing.
Figure 20:
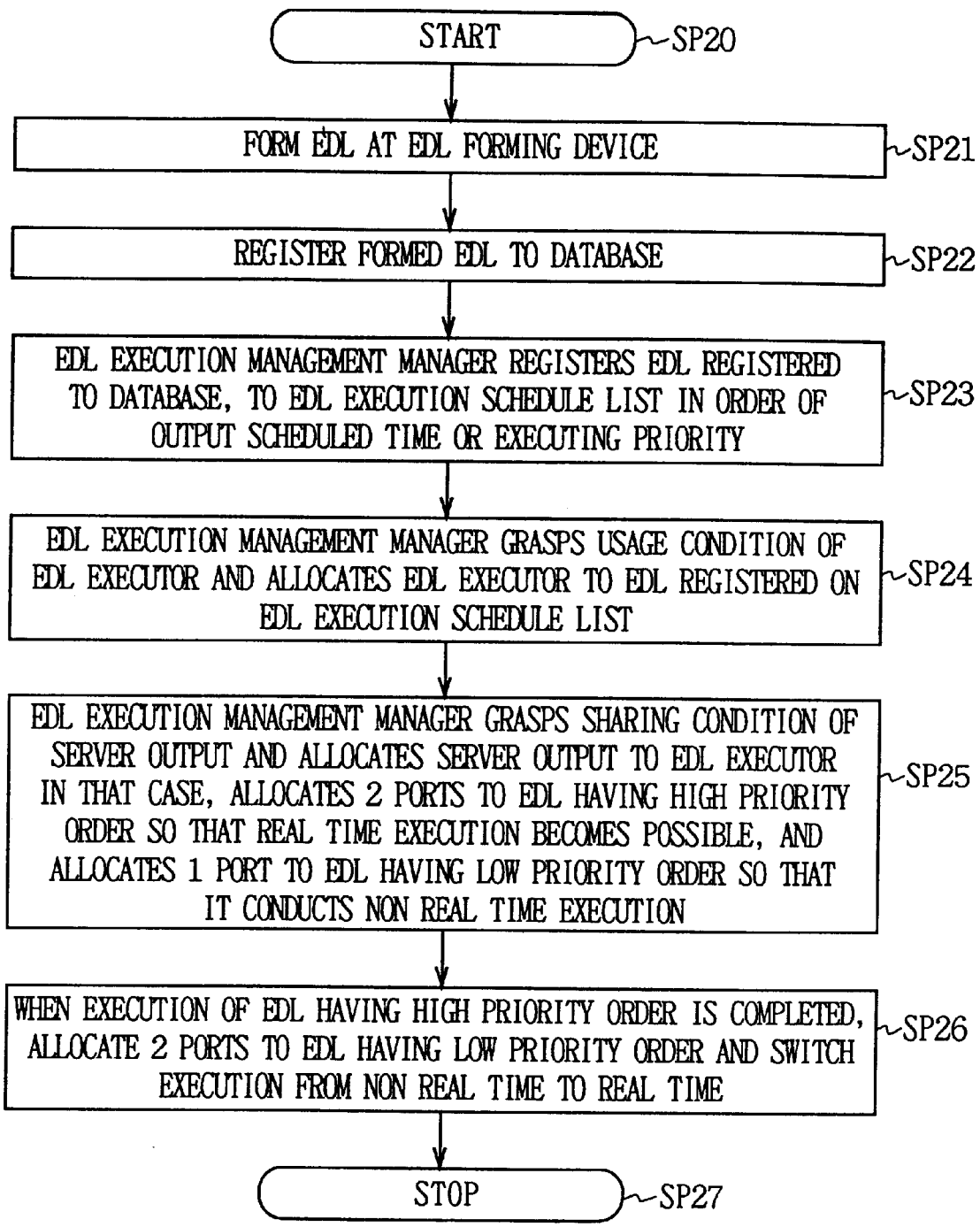
FIG. 20 is a flow chart illustrating the scheduling in the case where the server output is not sufficient.

At this point, the scheduling work to be conducted by the system ontrol unit 26 will be described more specifically referring to flow charts shown in FIGS. 18–20. Firstly, the scheduling procedure in the case of executing the A/B roll editing will be explained referring to FIG. 18. At the step SP2 entered from the step SP1, the EDL will be formed by the EDL forming devices 34A–34N and at the following step SP3, when that EDL formed is registered in the external memory device 35 as the database, the system control unit 26 moves to the following step SP4 and executes the schedule list forming work. More specifically, at the step SP4, the EDL execution management manager reads out the on-air list and the execution priority order information from the external memory device 35, and based on said on-air list and the execution priority order information, by arranging the EDL registered according to the output schedule time or execution priority order, registers these onto the EDL execution schedule list.

Then, at the following step SP5, the EDL execution management manager grasps the usage condition of each executor 40A–40N and allocates the EDL executors 40A–40D to the EDL registered on the EDL execution schedule list. At the following step SP6, the EDL execution management manager grasps the usage condition of the server output (i.e., output port of the server storage 30E) and allocates the server output for 2 ports to the EDL executor to conduct the A/B roll editing.

At the following step SP7, the EDL execution management manager transmits the EDL data to each EDL executor 40A 40N. Then, at the following step SP8, each EDL executor 40A–40N executes the editing processing based on the EDL data transmitted and transmits the resulting AV data D13A–D13D to the on-air server 41. With this arrangement, when each processing is completed, the system control unit 26 moves to the following step SP9 and terminates the processing.

Then, the scheduling procedure in the case of executing the interruption processing will be explained with reference to FIG. 19. Firstly, at the step SP11, entered from the step SP10, during all EDL executors 40A–40N are operating, if the EDL having the high priority order is registered on the EDL execution schedule list, the system control unti 26 moves to the following step SP12 and executes the interruption proessing. More specifically, at the step SP12, the EDL execution management manager obtains the conditions of each EDL executor 40A–40D in operation and temporarily stops the operation of the EDL executor which is conducting the EDL having the lowest priority order and temporarily stops the execution of that EDL. And then, the EDL execution management manager transmits the EDL having the high priority order to the EDL executor and makes that EDL executor conduct that EDL.

At the following step SP13, the EDL execution management manager grasps the conditions of each EDL executor 40A–40D, and when either one of EDL executors completes the editing processing and the vacancy occurs in the EDL executor, transmits the EDL interrupted before to the vacant EDL executor and makes this execute that EDL. With this arrangement, each processing is completed, the system control unit 26 moves to the step SP14 and terminates the interruption processing.

Then, the scheduling procedure in the case where the server output is not sufficient will be explained referring to FIG. 20. Firstly, at the step SP21 entered from the step SP20, when the EDL is formed by the EDL forming devices 34A–34N and at the following step SP22, that formed EDL is registered in the external memory device 35 as the database, the system control unit 26 moves to the following step SP23 and conducts the schedule list forming work. More specifically, at the step SP23, the EDL execution management manager reads out the on-air list and the execution priority order information from the external memory device 35 and based on said on-air list and the execution priority order information, arranging the EDL registered according to output scheduled time or the execution priority order, registers these on the EDL execution schedule list.

At the step SP24, the EDL execution management manager grasps the usage conditions of each EDL executor 40A–40N, and allocates EDL executors 40A–40D in due order to the EDL registered on the EDL execution schedule list. Then, at the following step SP25, the EDL execution management manager grasps the occupancy conditions of the server output (i.e., output port of the server storage 30E) and allocates the server output to each EDL executor 40A–40N. In this case, if the server output is smaller than the number required for executing all EDLs (i.e., if the server output is insufficient), it allocates the server output for 2 ports to the EDL executor to execute the EDL with high priority order and executes the EDL having the high priority order in real time and allocates the server output for one port to the EDL executor to execute the EDL with the low priority order and executes the EDL with the low priority order non real time. Thus, the EDL with the high priority order can be processed rapidly.

At the step SP26, the EDL execution management manager grasps the ongoing conditions of the editing processing, and when the vacancy occurs in the server output since the execution of EDL having the high priority order is completed, allocates the server output for 2 ports to the EDL executor conducting the EDL having the low priority order and switches the editing processing being conducted in non real time to real time. Thus, when each processing is completed, the system control unit 26 moves to the following step SP27 and completes the processing.

(13) Operation of Schedule Management

According to the foregoing construction, in this news program production broadcasting system 20, the EDL is formed by the EDL forming devices 34A–34N and this is registered on the external memory device 35 connected to the system control unit 26 as the database. Also if necessary, the execution priority order information showing the execution priority order of that EDL is registered as the database. Moreover, the on-air list is formed in utilizing the personal computers 39A–39N of the on-air list forming system 23 and this is registered in the external memory device 35 as the database.

The program called as EDL execution management manager for managing the schedule of the editing processing is stored in the external memory device 35, and by uploading this EDL execution management manager to the memory area in the system control unit 26 and starting this, the system control unit 26 manages the schedule of the editing processing. In the case of managing the editing processing schedule, the system control unit 26 firstly reads out the on air list and the execution priority order information from the external memory device 35, and based on these information, arranging the EDL registered according to the scheduled output time or the execution priority order and registers these on the EDL execution schedule list. And the system control unit 26, as well as allocating EDL executors 40A–40D to the EDL registered on the EDL execution schedule list, by controlling the router 30C of the daily server 30 according to the contents of the EDL allocated to the EDL executors 40A–40D and the priority order of the EDL, allocates the server output to said EDL executors 40A–40D. And after such allocation work, the system control unit 26 transmits the EDL data to the EDL executors 40A–40D and by causing said EDL executors 40A–40D to execute the EDL, the editing processing based on the EDL can be conducted.

Accordingly, in this news program production broadcasting system 20, by allocating the EDL registered to the EDL executors 40A–40D after considering the EDL execution priority order by the system control unit 26, the editing processing can be conducted without the involvement of operator conducting the EDL allocation work, and thus, the automatic editing processing requiring no involvement by the operator can be conducted.

Moreover, in this news program production broadcasting system 20, since the server output is allocated to the EDL executors 40A–40D by controlling the router 30C of the daily server 30, the editing processing can be conducted without the involvement of an operator in this point.

Furthermore, the system control unit 26, when the server output is not sufficient, allocating the server output for 2 ports to the EDL executor to which the EDL with high priority order, makes it execute real time editing, while allocating the server output for one port to the EDL executor to which the EDL having low priority order, causes this to execute non real time editing. Thus, the EDL having high priority order can be promptly processed and at the same time, the limited server output can be utilized efficiently. And thus, it becomes unnecessary to use the large sized server device having large server outputs and accordingly, the construction of the news program production broadcasting system 20 can be simplified and simultaneously, the cost of the news program production broadcasting system 20 can be decreased.

According to the foregoing construction, since the execution schedule of the editing processing is managed by the system control unit 26, and based on that management, EDL is allocated to the EDL executors 40A–40D, the editing processing can be conducted without the operator conducting the EDL allocation work as before, and the automatic editing which requires no involvement by the operator can be conducted and the editing work can be conducted more efficiently accordingly.

Furthermore, the embodiment described above has dealt with the case of having eight (8) output terminals OUT1–OUT8 as the daily server 30. However, the present invention is not only limited to this but also the other number may be acceptable as the number of output ports of the server storage 30E and the number of output terminals of the daily server 30.

Furthermore, the embodiment described above has dealt with the case of connecting four (4) EDL executors 40A–40D to the daily server 30. However, the present invention is not only limited to this but also as the number of the EDL executors to be connected to the daily server, the other number may be all right.

Moreover, the embodiment described above has dealt with the case of applying the present invention to the news program production broadcasting system 20. However, the present invention is not only limited to this but also it can be widely applied to the signal processing device which reads out video signal as the material recorded on the recording reproduction means and applies the desired editing processing. In short, in such a signal processing device, if the list forming means for forming the list in which editing contents are regulated, the editing execution means for reading out the desired video signal from the recording reproduction means based on the list allocated and conducting the editing processing, and the control means for managing the execution schedule of the editing processing and allocating the formed list to the editing execution means are provided, the editing processing can be executed without involvement by the operator and the automatic editing that requires no involvement by the operator can be conducted.

(14) Reference Reading Device

Figure 22:
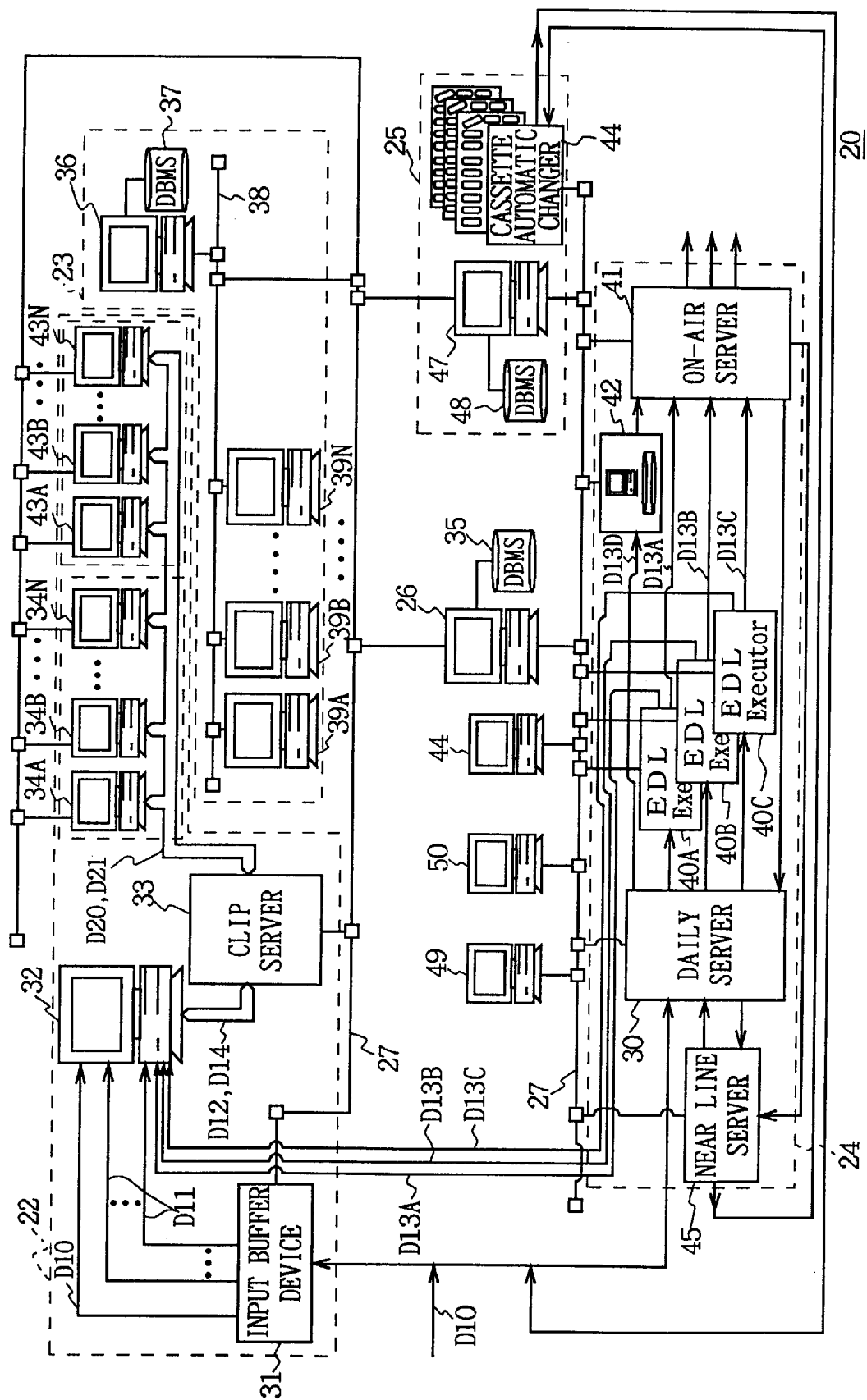
FIG. 22 is a block diagram showing one embodiment of the news program production broadcasting system according to the present invention.

FIG. 22 shows the construction of a news program production broadcasting system to which the plural number of reference reading devices 43A–43N are connected. As explained in the description of prior art, the reference reading devices 43A–43N are devices for monitor displaying the material before it is put on the air and for confirming before it is broadcasted.

Each file data stored in the clip server 33 (the high compressin coded data D14 comprised of the edited AV data D13A–D13C) can be read out using the plural number of each reference reading device 43A–43N connected to said clip server 33 via the LAN 27 respectively.

Each reference reading device 43A–43N, if the command to read out the desired file (high compression coded data D14 file) is entered by the operator in the case of reference reading mode, accesses to the system control unit 26 via the clip server 33 and the LAN 27 and by controlling the clip server 33 via said system control unit 26, causes the high compression coded data D21 of the file corresponding to said clip server 33 to be read out.

Furthermore, the reference reading devices 43A–43N combine the high compression coded data D21 read out from the clip server 33, and display the image on the monitor based on the AV data thus obtained and causes the sound based on said AV data to be put out.

At this point, the operator controls the clip server 33 via the reference reading devices 43A–43N and can make the clip server 33 execute the desired operation (such as reproduction, rewind or fast forward) and can confirm visually the editing result of the image displayed on the monitor in detail as occasion demands.

On the other hand, the on air server 41 is comprised of the AV server having the recording reproduction unit formed of an array of discs and successively captures the input AV data D13A–D13D under the control of the system control unit 26 and sets them into file and stores on the specified address position in the recording reproduction unit.

Then, based on the on air list data stored in the external memory device 35, the broadcasting time of each file data (edited AV data D13A–D13D) stored in the on air server 41 is managed by the on-air terminal 49 comprised of personal computers connected to the LAN 27, and when the specified time comes, it is read out from the on-air server 41 under the control of the system control unit 26 and transmitted to the on-air device of the later stage.

With this arrangement, in this news program production broadcasting system 20, the editing processing is executed using the AV data D10 non-compressed or low compressed in the on-line editing output system 24 based on the EDL formed in the off line EDL forming system 22, and the resulting AV data D13A–D13D can be sent out to the on-air device based on the on-air list data, and thus, the news video and audio edited to the specified condition can be broadcasted at the specified time.

In addition to such constructions, in the case of this news program production broadcasting system 20, the near line server 45 formed of the AV server having large memory capacity but inexpensive recording reproduction unit such as MO (management optical) changer is provided and under the control of the system control unit 26, AV data D10, D13A D13D stored in the daily server 30 and the on-air server 41 can be transmitted to the near line server 45 and these can be stored in the near line server 45.

Moreover, the AV data D10, D13A–D13D stored in the near line server 45 can be transferred to the daily server 30 and stored in said daily server 30, and thus, without increasing the memory capacity of the recording reproduction unit in the daily server 30 formed of expensive disc arrays, the memory capacity of the input stage of the on line editing output system 24 can be increased.

Furthermore, the near line server 45 is connected to the cassette automatic changer 44 in the archive 25 via the prescribed interface such as SCSI (small computer system interface), and under the control of the system control unit 26, it transmits the AV data D10, D13A–D13D to the cassette automatic changer 44 in the archive 25 and can record said AV data D10, D13A–D13D on the prescribed recording medium such as magnetic tape via this cassette automatic changer 44. Thus, in this news program production broadcasting system 20, the necessary AV data can be stored as material.

At this point, various kinds of management data regarding the contents of the AV data D10, D13A–D13D will be supplied to the database management device 47 formed of personal computers connected to the archive 25 from the system control unit 26 via the LAN 27. And these various management data will be given to the external memory device 48 under the control of the database management device 47 and stored as database.

Moreover, at this point, under the control of system control unit 26, the draft data corresponding to the AV data D10, D13A–D13D can be transmitted to the database management device 47 of the archive 25 from the database management device 36 of the on-air list forming system 23 via the LAN 27, and these can be registered as database in the external memory device 48 under the control of the database management device 47.

Furthermore, the AV data D10, D13A–D13D recorded on the recording medium such as magnetic tape stored in the archive 25 can be reproduced by the cassette automatic changer 44 and can be transmitted to the input buffer device 31 of the off-line EDL forming system 22 and the daily server 30 of the on-line edit output system 24, and thus, the AV data D10, D13A–D13D stored can be used again for editing.

In the case of this news program production broadcasting system 20, the filing terminal 49 comprised of personal computer is connected to the LAN 27, and by using this filing terminal 49 the specification of AV data D10 to be put into the input buffer device 31 and the daily server 30, the input of file name of said specified AV data D10, and the confirmation of the contents of the AV data D10 stored in the daily server 30 can be conducted.

Furthermore, in the case of this news program production broadcasting system 20, the EDL preview terminal 50 comprised of personal computer is connected to the LAN 27, and by using said EDL preview terminal 50, EDL data stored in the external memory device 35 can be read out, and making any one of EDL executors 40A–40C execute the editing based on said EDL data, that execution result can be displayed on the monitor (not shown in FIG.) connected to the EDL executors 40A–40C and can be sent out from the speaker.

Furthermore, in the case of this news program production broadcasting system 20, by using the on-air terminal 49 the desired file data (edited AV-data D13A–D13D) stored in the on-air server 41 can be read out and making the audio video based on said file data displayed on the monitor connected to the on-air server 41, can be sent out from the speaker. Thus, the operator can confirm the edited news video to be put on the air before it is broadcasted.

(15) Various Processings of System Control Unit

Here, in the news program production broadcasting system 20, the EDL forming processing, and the editing processing of AV data D10, and the reference reading processing of the edited video described above are conducted under the control of the system control unit 26.

Figure 23:
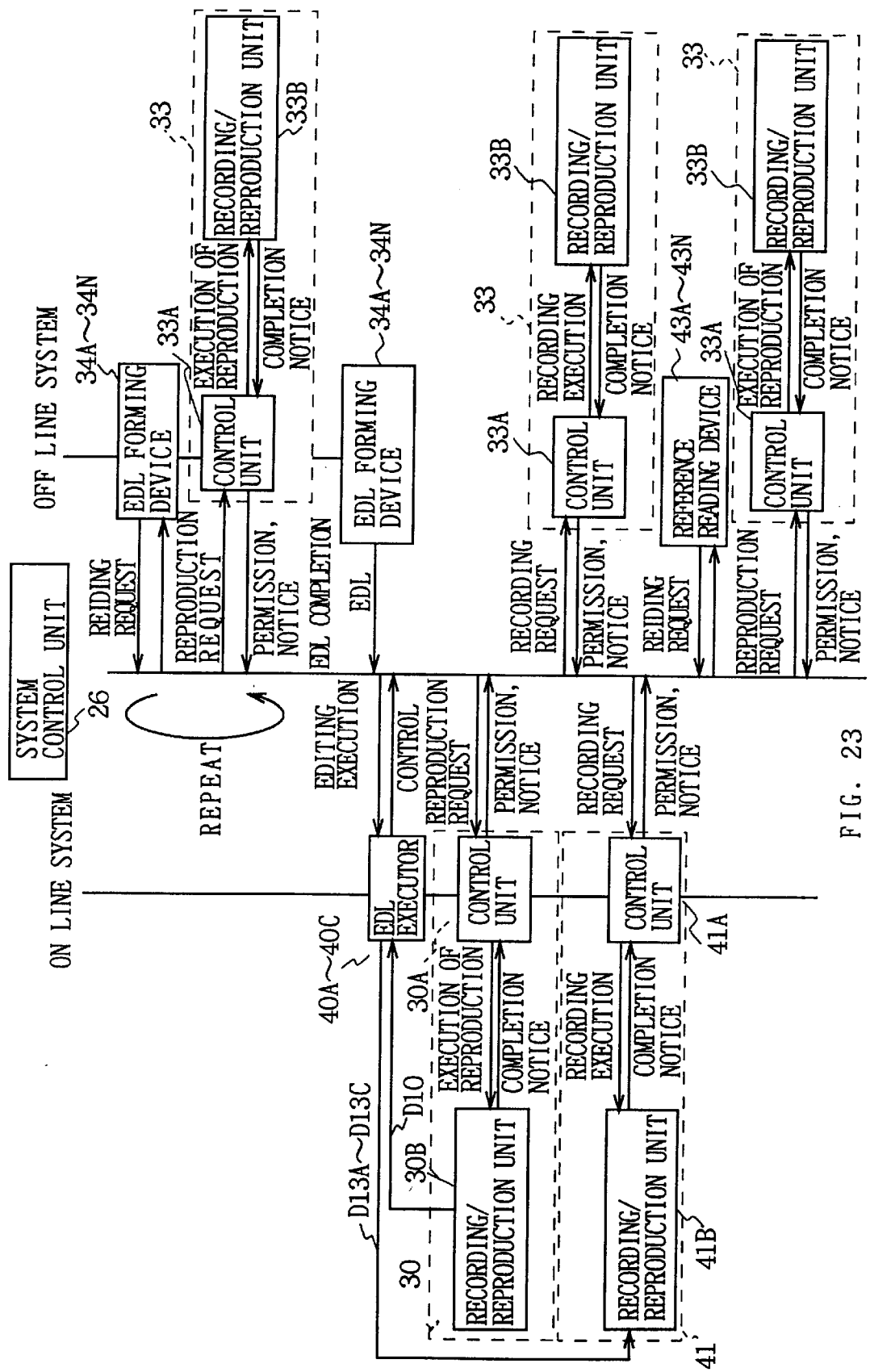
FIG. 23 is a schematic diagram illustrating various types of processings to be controlled by the system control unit.

In practice, as shown in FIG. 23, when the reading request of the file stored in the clip server 33 is obtained from the EDL forming devices 34A–34N by the operator's operation, the system control unit 26 gives the reproduction request to the control unit 33A of the clip server 33, and as a result, if the permission is obtained from the control unit 33A of the clip server 33, it gives reading permission to the corresponding EDL forming devices 34A–34N.

Then, the system control unit 26, when the reading command of the fixed file is obtained from the EDL forming devices 34A–34N, by giving the reproduction command of the file specified by the reading command to the control unit 33A of the clip server 33, makes the high compression coded data D20 of the corresponding file read out from the recording reproduction unit 33B via the control unit 33A of the clip server 33 and output to the corresponding EDL forming devices 34A–34N.

Accordingly, the system control unit 26 conducts the same operation whenever the reading request is obtained from the EDL forming devices 34A–34N, and thus causes the images based on the high compression coded data D20 of the specified file to be displayed on the monitor.

Hence, when the system control unit 26 obtains the registration request of the formed EDL and EDL data from the EDL forming devices 34A–34N, stores this in the external memory device 35.

Furthermore, the system control unit 26 constantly guards the operating condition of each EDL executor 40A–40C and if any one of the EDL executors 40A–40C becomes the vacant condition, it reads out the EDL data from the external memory device 35 and outputs this to the EDL executor 40A–40C of the vacant condition.

Accordingly, when the system control unit 26 obtains the reproduction request of the AV data D10 to be edited based on the EDL from the EDL executors 40A–40C, it gives the reproduction request to the control unit 30A of the daily server 30 and simultaneously gives the record storage request to the control unit 41A of the on-air server 41 and the control unit 33A of the clip server 33.

As a result, if the system control unit 26 obtains the permissions from the control unit 30A of the daily server 30, the control unit 41A of the on-air server 41 and the control unit 33A of the clip server 33 respectively, by giving the reproduction command of the specified AV data D10 to the control unit 30A of the daily server 30, makes that AV data D10 read out from the recording reproduction unit 30B via the control unit 30A of the daily server 30 and output to the corresponding EDL executors 40A–40C.

At this point, the system control unit 26, by giving the record storage request to the control unit 41A of the on-air server 41 and the control unit 33A of the clip server 33, causes the edited AV data D13A–D13C to be sent out at this point from the EDL executors 40A–40C successively stored in the recording reproduction unit 41B of the on-air server 41, and simultaneously causes said edited AV data D13A–D13C to be high compression coded and stored in the recording reproduction unit 33 of the clip server 33.

Then, when the reading request of the file stored in the clip server 33 is obtained from the reference reading device 43A–43N based on the operator's operation, the system control unit 26 gives the reproduction request to the control unit 33A of the clip server 33, and as a result, if the permission is obtained from the control unit 33A of the clip servr 33, it gives the reading permission to the corresponding reference reading devices 43A–43N.

Afterwards, when the reading command of the fixed file is obtained from the reference reading devices 43A–43N, the system control unit 26, by giving the reproduction command of the file specified by the reading command to the control unit 33A of the clip server 33, causes the high compression coded data D21 of the corresponding file to be read out from the recording reproduction unit 33B via the control unit 33A of the clip server 33 and output to the corresponding reference reading devices 43A–43N. Thus, the system control unit 26 conducts the same operation whenever the reading request of the file is obtained from the reference reading devices 43A–43N, and monitor displays the edited video based on the high compression coded data D21 of the file specified on the corresponding reference reading devices 43A–43N and outputs sounds based on said high compression coded data D21 from the speaker of the reference reading device 43A–43N.

(16) Operation of Reference Reading Device

According to the foregoing construction, in the news program production broadcasting system 20, the non-compressed or low compressed AV data D10 obtained by the material collection is stored in the daily server 30 and simultaneously said AV data is high compression coded and stored in the clip server 33. And the high compression coded data D20 stored in the clip server 33 is read out by the EDL forming devices 34A–34N and the image based on this will be displayed on the monitor and EDL will be formed based on said image. And thus formed EDL will be registered on the external memory device 35.

Moreover, in the news program production broadcasting system 20, the EDL data stored in the external memory device 35 is read out as required and transmitted to the EDL executors 40A–40C, and thus, in the EDL executors 40A–40C, the corresponding AV data D10 read out from the daily server 30 based on the EL data will be editing processed. At this point, the edited AV data D13A–D13C obtained from the EDL executors 40A–40C will be stored in the on air server 41 and simultaneously said AV data D13A–D13C will be high efficiency coded and stored in the clip server 33.

Thus, in the news program production broadcasting system 20, the edited high compression coded data D21 stored in the clip server 33 is read out by the reference reading devices 43A–43N and the image based on this is displayed on the monitor and sounds based on said high compression coded data D21 is sent out from the speaker.

In this case, since in the news program production broadcasting system 20 the edited non-compressed or low compressed AV data D13A–D13C to be obtained from the EDL executors 40A–40C are high efficiency coded and stored in the clip server 33, supposing that the second AV server 3 (FIG. 2) provided in the conventional news program production broadcasting system 1 (FIG. 2) and the clip server 33 have the same construction, the transmission capacity of the clip server 33 can be outstandingly increased as compared with said second AV server 3. Accordingly, the number of reference reading devices 43A–43N which can be connected to the clip server 33 can be increased tremendously as compared with the number of reference reading devices 7A–7N which can be connected to the second AV server 3.

In addition to the above, since each reference reading device 43A–43N is connected to the clip server 33 via the LAN 27, it can be placed in plural number of rooms for the program production respectively. Thus, the personnel who works for the program production or related field can confirm the edited result of the news video to be actually put on air before it is broadcasted by using the reference reading device 43A–43N in his own room.

Furthermore, in this news program production broadcasting system 20, since the high compression coded data D20 which is not yet edited is read out from the clip server 33 by using the EDL forming devices 34A–34N and the edited high compression coded data D21 can be read out from said clip server 33 by using the reference reading devices 43A–43N, if error occurs in the data on the LAN 27 of the off line EDL forming system 22 and the on line edit output system 24 or not can be found by confirming whether the edited part and the corresponding part before it is edited in one image are equal or not, and thus, the reading reference system of images can be used for simple maintenance and inspection of the system.

According to the foregoing construction, since the non-compressed or low compressed AV data D10 obtained by collecting materials is stored in the daily server 30, and said AV data D10 is high efficiency coded and stored in the clip server 33, and EDL is formed by each EL forming device 34A–34N based on the high compression coded data D20 stored in said clip server 33, and based on the EDL formed in each EDL forming device 34A–34N the corresponding AV data D10 stored in the daily server 30 is edited by each EDL executor 40A–40C, and the resulting AV data D13A–D13C are high efficiency coded and stored in the clip server 33, and the high compression coded data D21 stored in said clip server 33 is read out and as well as monitor displaying the image based on this, the sound is put out from the speaker, the number of reference reading devices 43A–43N which can be connected to the clip server 33 can be tremendously increased, and by providing these increased reference reading devices 43A–43N respectively in plural number of rooms for program production, the edited result of the news video to be actually put on air can be confirmed in advance by the personnel who works for the program production or the related field in his own room, and thus, the news program production broadcasting system capable of further improving the efficiency of the program production can be realized.

(17) Other Embodiments

The embodiment described above has dealt with the case of high efficiency coding the edited AV data D13A–D13C obtained by the EDL executors 40A–40C to approximately 2 (Mbps) with the prescribed compression system such as JPEG system in the encoder unit 32. However, the present invention is not only limited to this but also said AV data D13A–D13C may be compressed higher than the high efficiency coding of approximately 2 (Mbps) with the prescribed compression system. Thereby, the transmission capacity in the clip server 33 can be increased and accordingly the number of reference reading devices 43A–43N can be further increased.

Furthermore, the embodiment described above has dealt with the case of storing the edited AV data D13A–D13C obtained by the EDL executors 40A–40C in the clip server 33 via the encoder unit 32. However, the present invention is not only limited to this but also said edited AV data D13A–D13C may be stored in the clip server 33 through the input buffer unit 31 and the encoder unit 32 successively.

Moreover, the embodiment described above has dealt with the case where the image edited by the reference reading devices 43A–43N can be referred and read. However, the present invention is not only limited to this but also the image not yet edited may be referred in addition to the edited image. Thereby, the usability of the reference reading devices 43A–43N can be improved.

Furthermore, the embodiment described above has dealt with the case of applying the daily server 30 as the first memory means for memorizing and holding the non-compressed or low compressed AV data D10 to be supplied. However, the present invention is not only limited to this but also the first memory means having various other constructions such as memory may be applied provided that the non-compressed or low compressed AV data D10 to be supplied can be memorized and held.

Furthermore, the embodiment described above has dealt with the case of applying the encoder unit 32 and the clip server 33 as the second memory means for high compressing and memorizing the non compressed or low compressed AV data to be supplied. However, the present invention is not only limited to this but also if the non compressed or low compressed AV data D10 to be supplied can be high compressed and stored, the second memory means having various other constructions may be applied.

Furthermore, the embodiment described above has dealt with the case of applying the EDL forming devices 34A–34N as the list forming means for regulating the editing execution order based on the high compressed AV data D20 stored in the second memory means 32 and 33. However, the present invention is not only limited to this but also various other list forming means may be applied, provided that the list to regulate the editing execution order can be formed based on the high compressed AV data D20 stored in the second memory means 32 and 33.

Furthermore, the embodiment described above has dealt with the case of applying the reference reading devices 43A–43N as the image display means for displaying images based on the high compressed AV data D21. However, the present invention is not only limited to this but also various other image display means may be applied provided that the image based on the high compressed AV data D21 stored in the second memory means 32 and 33 can be displayed.

Moreover, the embodiment described above has dealt with the case of applying the EDL executors 40A–40C as the editing means for editing the non compressed or low compressed AV data D10 stored in the first memory means. However, the present invention is not only limited to this but also various other editing means may be applied, provided that the non compressed or low compressed AV data D10 stored in the first memory means 30 can be edited based on the list formed in the list forming means 34A–34N.

Moreover, the embodiment described above has dealt with the case of applying the present invention to the news program production broadcasting system 20. However, the present invention is not only limited to this but also this invention may be applied to various other signal processing devices which are capable of editing the video signal to be supplied.

According to the present invention described above, as well as the contents of video signal stored in the first and the second memory means can be confirmed by a great many people, the editing execution order list can be formed by many more personnel, and thereby the signal processing device capable of improving the efficiency of the program production work can be realized.

Furthermore, according to the present invention, as well as many more people can confirm the contents of the video signal, the editing execution order list can be formed by many more personnel, and thus, the signal processing method capable of improving the efficiency of program production work can be realized.

Moreover, according to the present invention, by combining the audio file recorded on the terminal connected via the network with video signal and/or audio signal and synchronizing with the video system, the audio file recorded on the terminal can be used as the broadcasting material.

Moreover, according to the present invention, since the control means for allocating the list on which editing contents are regulated to the editing execution means is provided, the editing processing can be conducted without involvement of the operator as the conventional device and automatic editing requiring no involvement of the operator can be conducted. Thus, the signal processing device capable of conducting the editing work more efficiently can be obtained.

Furthermore, according to the present invention as described above, providing the image display means in the plural number of rooms for program production respectively, the personnel who works for the program production or the related field can confirm the edited result of the news video before it is actually put on air from his own room, and thus the signal processing device capable of improving the efficiency of the program production work can be realized.

Furthermore, according to the present invention, multiple perspnnel related to the program production work can confirm the edited result of the news video before it is actually broadcasted staying in their own rooms respectively, and thereby the signal processing method capable of improving the efficiency of the program production work can be realized.

POSSIBLE USAGE IN THE INDUSTRIAL FIELD

The signal processing device and the signal processing method according to the present invention can be used in the news program production broadcasting system for producing the news program upon editing the news materials collected in the field at the broadcasting station.

What is claimed is:

1. A signal processing device comprising:

first memory means for memorizing a non-compressed or low-compressed input signal;

second memory means for memorizing a high-compressed input signal;

editing execution order list forming means for forming an editing execution order list, the editing executing order being based upon said high-compressed signal stored in said second memory means; and editing execution order list executing means for editing said non-compressed or low-compressed signal stored in said first memory means based upon said editing execution order list and for outputting the edited signal.

2. The signal processing device of claim 1, further comprising:

third memory means for storing said edited signal output from said editing execution order list executing means; and output order list forming means for forming an output order list of the output order of the signal in said third memory means, wherein said edited signal stored to said third memory means is output therefrom based on said output order list.

3. A signal processing method, comprising the steps of:

storing a non-compressed or low-compressed input signal and simultaneously storing a high-compressed input signal;

forming an editing execution order list in which the editing execution order is determined based on said high-compressed signal; and editing and outputting said non-compressed or low-compressed signal based on said editing execution order list.

4. The signal processing method of claim 3, further comprising the steps of:

storing the output edited signal; and forming an output order list of the output order of the stored output edited signal, wherein said stored output edited signal is output based on the output order list.

5. A signal processing device comprising:

first memory means for storing a signal entered at a speed higher than real time after the high speed signal is low-compressed or not compressed;

second memory means for storing the signal entered at a speed higher than real time after the high speed signal is high-compressed;

editing execution order list forming means for forming an editing execution order list in which the editing execution order is determined based on said high-compressed signal stored in said second memory means; and editing execution order list executing means for editing said non-compressed or low-compressed signal stored in said first memory means based on said editing execution order list, and for outputting the edited signal.

6. The signal processing device of claim 5, wherein:

said first memory means stores said input signal, expands said signal to real time and successively reads and outputs said expanded signal.

7. A signal processing method, comprising the steps of:

storing a signal entered at a speed higher than real time after the high speed signal is low-compressed or not compressed;

storing the signal entered at a speed higher than real time after the high speed signal is high-compressed;

forming an editing execution order list in which the editing execution order is determined based on said high-compressed signal;

editing said stored non-compressed or low-compressed signal based on said editing execution order list; and outputting the edited signal.

8. The signal processing method of claim 7, wherein:

said signal is expanded to real time before being high-compressed and stored.

9. A signal processing device comprising:

first memory means for storing an input signal after being low-compressed or not being compressed;

second memory means for storing said input signal after being high-compressed;

list forming means for forming a list to define an editing execution order based on the high-compressed signal stored in said second memory means;

image display means for displaying images based on said high-compressed signal stored in said second memory means; and editing means for editing said non-compressed or low compressed signal stored in the first memory means based on the list formed by the list forming means, wherein said editing means supplies the edited signal to the second memory means, said second memory means stores said edited signal supplied from said editing means after being high-compressed, and said image display means displays the image based on said edited signal stored in the second memory means.

10. The signal processing device of claim 9, wherein said image display means is connected to the second memory means via a network.

11. A signal processing method, comprising the steps of:

storing an input signal after being high-compressed;

storing the input signal after being low-compressed or not compressed;

forming a list to define an editing execution order based on said high-compressed signal;

editing said non-compressed or low-compressed signal based on the editing execution list; and displaying and storing the edited signal.

12. A signal processing device comprising:

first memory means for storing a signal entered at a speed higher than real time after being low-compressed or not compressed;

input buffer means for expanding to real time the signal entered at a speed higher than said real time;

second memory means for storing said expanded signal after being high-compressed;

editing execution order list forming means for forming an edited execution order list which defines the editing execution order based on said expanded high-compressed signal stored in the second memory means; and editing execution order list executing means for editing and outputting said non-compressed or low-compressed signal stored in the first memory means, said editing being generated based upon said editing execution order list.

13. The signal processing device of claim 12, wherein:

said input buffer means outputs the signal expanded to real time via multiple channels; and said second memory means stores signals expanded to real time from each of said multiple channels after each of said expanded signals is high-compressed.

14. A signal processing method, comprising the steps of:

storing a signal entered at a speed higher than real time after the signal is expanded to real time and after being high-compressed;

storing the signal entered at a speed higher than real time after being low-compressed or not compressed;

forming an editing execution order list to define an editing execution order based on said expanded high-compressed signal; and editing said stored non-compressed or low-compressed signal based on said editing execution order list.

15. A signal processing device for reading out a composite signal containing a video signal portion, an audio signal portion, or both, from a memory means under the control of control means, comprising:

a terminal device connected to said signal processing device via a network; and an editing execution order list defining apparatus for establishing an editing execution order list to define an editing execution order; and combining means for combining an audio signal collected at the terminal device and said composite signal read from said memory means in accordance with said editing execution order list, thereby forming edited material.

16. The signal processing device of claim 15, wherein said audio signal is stored in said memory means with the composite signal.

17. The signal processing device of claim 16, wherein said audio signal is transmitted to said memory means via said network.

18. The signal processing device of claim 15, wherein said combining means further comprises editing means for receiving the audio signal from the signal processing device via said network and for editing the composite signal; and a transmitter for transmitting the edited signal from said signal processing device.

19. The signal processing device of claim 15, further comprising:

high compression recording means for recording the composite signal after being high-compressed, said high compression recording means being connected to said terminal device; and low compression recording means for recording the composite signal after being low-compressed or not compressed.

20. A signal processing device for reading out a signal stored in a memory means and applying editing processing thereto, comprising:

list forming means for forming a list to define a plurality of editing functions using a high-compressed signal read from said memory means;

editing execution means for reading out a desired non-compressed or low-compressed signal from said memory means based on said list and for executing desired editing functions; and control means for managing an execution schedule of the editing functions and constructing said editing execution means based upon said list.

21. The signal processing device of claim 20, wherein said editing execution means applies a special effect editing to said read out signal, if said read out signal is a video signal.

* * * * *